United States Patent
Ng et al.

(10) Patent No.: US 8,768,102 B1
(45) Date of Patent: Jul. 1, 2014

(54) DOWNSAMPLING LIGHT FIELD IMAGES

(75) Inventors: Yi-Ren Ng, Redwood City, CA (US); Kurt Barton Akeley, Saratoga, CA (US); Timothy James Knight, Palo Alto, CA (US); Colvin Pitts, Snohomish, WA (US)

(73) Assignee: Lytro, Inc., Mountain View, CA (US)

( * ) Notice: Subject to any disclaimer, the term of this patent is extended or adjusted under 35 U.S.C. 154(b) by 178 days.

(21) Appl. No.: 13/362,496

(22) Filed: Jan. 31, 2012

Related U.S. Application Data

(60) Provisional application No. 61/440,963, filed on Feb. 9, 2011.

(51) Int. Cl.
  *G06K 9/32* (2006.01)
(52) U.S. Cl.
  USPC ......................................................... 382/299
(58) Field of Classification Search
  USPC ......... 250/559.04; 345/3.3, 698; 375/E7.099, 375/E7.145, E7.253; 382/299; 708/313
  See application file for complete search history.

(56) References Cited

U.S. PATENT DOCUMENTS

| | | | |
|---|---|---|---|
| 725,567 | A | 4/1903 | Ives |
| 4,383,170 | A | 5/1983 | Takagi et al. |
| 4,661,986 | A | 4/1987 | Adelson |
| 4,694,185 | A | 9/1987 | Weiss |
| 4,920,419 | A | 4/1990 | Easterly |
| 5,076,687 | A | 12/1991 | Adelson |
| 5,282,045 | A | 1/1994 | Mimura et al. |
| 5,610,390 | A | 3/1997 | Miyano |
| 5,748,371 | A | 5/1998 | Cathey, Jr. et al. |
| 5,757,423 | A | 5/1998 | Tanaka et al. |
| 5,949,433 | A | 9/1999 | Klotz |
| 6,023,523 | A | 2/2000 | Cohen et al. |
| 6,028,606 | A | 2/2000 | Kolb et al. |
| 6,097,394 | A | 8/2000 | Levoy et al. |
| 6,201,899 | B1 | 3/2001 | Bergen |
| 6,320,979 | B1 | 11/2001 | Melen |
| 6,483,535 | B1 | 11/2002 | Tamburrino et al. |

(Continued)

FOREIGN PATENT DOCUMENTS

| | | |
|---|---|---|
| DE | 19624421 | 6/1996 |
| WO | 03052465 | 6/2003 |

(Continued)

OTHER PUBLICATIONS

Adelson et al., "Single Lens Stereo with a Plenoptic Camera" IEEE Translation on Pattern Analysis and Machine Intelligence, Feb. 1992. vol. 14, No. 2, pp. 99-106.

(Continued)

*Primary Examiner* — Gregory F Cunningham
(74) *Attorney, Agent, or Firm* — Raubvogel Law Office

(57) ABSTRACT

According to various embodiments of the invention, improved downsampling techniques are employed, which can be applied to light field images and which preserve the ability to refocus (and otherwise manipulate) such images. Groups of pixels, rather than individual pixels, are downsampled; such groups of pixels can be defined, for example, as disks of pixels. Such downsampling is accomplished, for example, by aggregating values for pixels having similar relative positions within adjacent disks (or other defined regions or pixel groups) of the image. When applied to light field images, the downsampling techniques of the present invention reduce spatial resolution without sacrificing angular resolution. This ensures that the refocusing capability of the resulting light field image is not reduced and/or adversely impacted.

28 Claims, 14 Drawing Sheets

(56) References Cited

U.S. PATENT DOCUMENTS

| | | |
|---|---|---|
| 6,577,342 B1 | 6/2003 | Wester |
| 6,597,859 B1 | 7/2003 | Leinhart et al. |
| 6,687,419 B1 | 2/2004 | Atkin |
| 6,842,297 B2 | 1/2005 | Dowski, Jr. et al. |
| 6,900,841 B1 | 5/2005 | Mihara |
| 6,927,922 B2 | 8/2005 | George et al. |
| 7,034,866 B1 | 4/2006 | Colmenarez et al. |
| 7,164,807 B2 | 1/2007 | Morton |
| 7,336,430 B2 | 2/2008 | George et al. |
| 7,620,309 B2 | 11/2009 | Georgiev |
| 7,623,726 B1 | 11/2009 | Georgiev |
| 7,949,252 B1 | 5/2011 | Georgiev |
| 8,155,478 B2 | 4/2012 | Vitsnudel et al. |
| 2002/0159030 A1 | 10/2002 | Frey et al. |
| 2003/0103670 A1 | 6/2003 | Schoelkopf et al. |
| 2003/0117511 A1 | 6/2003 | Belz et al. |
| 2003/0156077 A1 | 8/2003 | Balogh |
| 2004/0114176 A1 | 6/2004 | Bodin et al. |
| 2004/0257360 A1 | 12/2004 | Sieckmann |
| 2005/0080602 A1 | 4/2005 | Snyder et al. |
| 2006/0130017 A1 | 6/2006 | Cohen et al. |
| 2007/0071316 A1 | 3/2007 | Kubo |
| 2007/0230944 A1 | 10/2007 | Georgiev |
| 2007/0252074 A1 | 11/2007 | Ng et al. |
| 2008/0007626 A1 | 1/2008 | Wernersson |
| 2008/0018668 A1 | 1/2008 | Yamauchi |
| 2008/0131019 A1 | 6/2008 | Ng |
| 2008/0152215 A1 | 6/2008 | Horie et al. |
| 2008/0180792 A1 | 7/2008 | Georgiev |
| 2008/0187305 A1 | 8/2008 | Raskar |
| 2008/0193026 A1 | 8/2008 | Horie et al. |
| 2008/0226274 A1 | 9/2008 | Spielberg |
| 2008/0266655 A1 | 10/2008 | Levoy et al. |
| 2008/0309813 A1 | 12/2008 | Watanabe |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0102956 A1 | 4/2009 | Georgiev |
| 2009/0128658 A1 | 5/2009 | Hayasaka et al. |
| 2009/0128669 A1 | 5/2009 | Ng et al. |
| 2009/0140131 A1 | 6/2009 | Utagawa |
| 2009/0185801 A1 | 7/2009 | Georgiev et al. |
| 2009/0268970 A1 | 10/2009 | Babacan et al. |
| 2009/0273843 A1 | 11/2009 | Raskar |
| 2009/0295829 A1 | 12/2009 | Georgiev et al. |
| 2010/0026852 A1 | 2/2010 | Ng et al. |
| 2010/0097444 A1* | 4/2010 | Lablans ............... 348/46 |
| 2010/0128145 A1 | 5/2010 | Pitts et al. |
| 2010/0129048 A1 | 5/2010 | Pitts et al. |
| 2010/0141802 A1 | 6/2010 | Knight et al. |
| 2010/0277629 A1 | 11/2010 | Tanaka |
| 2011/0129165 A1 | 6/2011 | Lim et al. |
| 2012/0050562 A1 | 3/2012 | Perwass et al. |
| 2012/0201475 A1* | 8/2012 | Carmel et al. ........... 382/238 |

FOREIGN PATENT DOCUMENTS

| | | |
|---|---|---|
| WO | 2006039486 | 4/2006 |
| WO | 2007092545 | 8/2007 |
| WO | 2007092581 | 8/2007 |

OTHER PUBLICATIONS

Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.

Dowski et al., "Wavefront coding: a modern method of achieving high performance and/or low cost imaging systems" SPIE Proceedings, vol. 3779.

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54, 1996.

Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

Ives, H., "Optical properties of a Lippman lenticulated sheet," J. Opt. Soc. Am. 21, 171 (1931).

Jackson et al., "Selection of a Convolution Function for Fourier Inversion Using Gridding" IEEE Transactions on Medical Imaging, Sep. 1991, vol. 10, No. 3, pp. 473-478.

Levoy, M., et al., "Light Field Microscopy," ACM Transactions on Graphics, vol. 25, No. 3, Proceedings SIGGRAPH 2006.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Lippmann, "Reversible Prints", Communication at the French Society of Physics, Journal of Physics, 7 , 4, Mar. 1908, pp. 821-825.

Lumsdaine et al., "Full Resolution Lightfield Rendering" Adobe Technical Report Jan. 2008, pp. 1-12.

Naemura et al., "3-D Computer Graphics based on Integral Photography" Optics Express, Feb. 12, 2001. vol. 8, No. 2, pp. 255-262.

Ng, R., et al. "Light Field Photography with a Hand-Held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Okano et al., "Three-dimensional video system based on integral photography" Optical Engineering, Jun. 1999. vol. 38, No. 6, pp. 1072-1077.

Sokolov, "Autostereoscopy and Integral Photography by Professor Lippmann's Method" , 1911, pp. 23-29.

Tanida et al., "Thin observation module by bound optics (TOMBO): concept and experimental verification"Applied Optics 40, 11 (April), pp. 1806-1813, 2011.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

Vaish et al., "Using plane + parallax for calibrating dense camera arrays", In Proceedings CVPR 2004, pp. 2-9.

Wilburn et al., "High Performance Imaging Using Large Camera Arrays", ACM Transactions on Graphics (TOG), vol. 24, Issue 3 (Jul. 2005), Proceedings of ACM SIGGRAPH 2005, pp. 765-776.

Fitzpatrick, Brad, "Camlistore", Feb. 1, 2011, pp. 1-27, Retrieved from http://camlistore.org/.

Adelson, E. H., and Bergen, J. R. 1991. The plenoptic function and the elements of early vision. In Computational Models of Visual Processing, edited by Michael S. Landy and J. Anthony Movshon, Cambridge, Mass.: mit Press.

Adobe, "Photoshop CS6 / in depth: Digital Negative (DNG)", http://www.adobe.com/products/photoshop/extend.displayTab2html. Retrieved Jan. 2013.

Bolles, R., et al., "Epipolar-Plane Image Analysis: An Approach to Determining Structure from Motion", International Journal of Computer Vision, 1, 7-55 (1987).

Georgiev, T., et al., Plenoptic Camera 2.0 (2008).

Georgiev, T., et al., "Unified Frequency Domain Analysis of Lightfield Cameras" (2008).

Mallat, Stephane, "A Wavelet Tour of Signal Processing", Academic Press 1998.

Nakamura, J., "Image Sensors and Signal Processing for Digital Still Cameras" (Optical Science and Engineering), 2005.

Ogden, J., "Pyramid-Based Computer Graphics", 1985.

Story, D., "The Future of Photography", Optics Electronics, Oct. 2008.

Portable Network Graphics format: http://en.wikipedia.org/wiki/Portable_Network_Graphics. Retrieved Jan. 2013.

Exchangeable image file format: http://en.wikipedia.org/wiki/Exchangeable_image_file_format. Retrieved Jan. 2013.

(56) References Cited

OTHER PUBLICATIONS

Extensible Metadata Platform: http://en.wikipedia.org/wiki/Extensible_Metadata_Platform. Retrieved Jan. 2013.
Compression standard JPEG XR: http://en.wikipedia.org/wiki/JPEG_XR. Retrieved Jan. 2013.
Methods of Variable Bitrate Encoding (http://en.wikipedia.org/wiki/Variable_bitrate#Methods_of_VBR_encoding). Retrieved Jan. 2013.
Lazy loading of image data (http://en.wikipedia.org/wiki/Lazy_loading). Retrieved Jan. 2013.
Key framing for video animation (http://en.wikipedia.org/wiki/Key_frame). Retrieved Jan. 2013.
Data overlay techniques for real-time visual feed. For example, heads-up displays (http://en.wikipedia.org/wiki/Head-up_display). Retrieved Jan. 2013.
Autofocus systems and methods (http://en.wikipedia.org/wiki/Autofocus). Retrieved Jan. 2013.
Williams, L., "Pyramidal Parametrics", Computer Graphics (1983).

* cited by examiner

DOWNSAMPLING LIGHT FIELD IMAGES

CROSS-REFERENCE TO RELATED APPLICATIONS

The present application claims priority from U.S. Provisional Application Ser. No. 61/440,963 for "Circuitry and Techniques for Downsampling Light-Field Images," filed Feb. 9, 2011, the entire disclosure of which is incorporated herein by reference.

The present application is related to U.S. Utility application Ser. No. 12/703,367 for "Light Field Camera Image, File and Configuration Data, and Method of Using, Storing and Communicating Same," filed Feb. 10, 2010, the entire disclosure of which is incorporated herein by reference. U.S. Utility application Ser. No. 12/703,367 claimed priority from U.S. Provisional Application Ser. No. 61/170,620 for "Light Field Camera Image, File and Configuration Data, and Method of Using, Storing and Communicating Same," filed Apr. 18, 2009, the entire disclosure of which is incorporated herein by reference.

FIELD OF THE INVENTION

The present invention relates to processing of images captured in a light field camera, and more particularly to techniques for reducing the pixel resolution of light field image data while preserving the ability to refocus (and otherwise manipulate) the image.

BACKGROUND

It is often beneficial to generate reduced-resolution versions of images that were captured at high resolution. Many digital still capture devices are able to capture images with resolutions of 10 to 30 million pixels, and some can capture images at even higher resolutions. However, not all applications may benefit from such high image resolution, and high-resolution images require significant computing resources for transmission and for storage.

For example, video capture is an application that, in general, does not require the same resolution as is available from still cameras. 1080p high-definition video, which is the highest-resolution video format generally available in the United States, requires 2,073,600 pixels per frame. Thus video capture requires less than one tenth of the pixel resolution that is available in many current digital still capture devices. It is well known to generate reduced-resolution versions of captured images, for example to allow use of captured images in video sequences.

The process of generating reduced-resolution versions of captured images is referred to herein as "downsampling". Downsampling may be implemented at any point in the post-capture image processing chain, either at the image capture device (camera) or at some other device.

Downsampling may be implemented, for example, as a two-step process wherein the image is prefiltered and then subsampled. Alternatively, downsampling can be implemented in a single step, wherein the downsampled image is reconstructed from the high-resolution image. In general, in either technique, each pixel in the resulting downsampled image has a value that is determined by a small group of pixels adjacent to the corresponding location in the original high-resolution image. Conventionally, downsampling is performed by reducing a group of adjacent pixels in the original image into a single pixel in the downsampled image. For example, an image can be downsampled by a factor of two in both spatial dimensions by computing each output pixel of the downsampled image as the average (or sum) of a correspondingly positioned 2×2 quadrilateral of input pixels of the original image. In general, the pixels that are used in generating a single output pixel are adjacent to one another in the original image.

Light field photography captures information about the direction of light as it arrives at a sensor within a data acquisition device such as a light field camera. Such light field data can be used, along with captured image data, to create representations of scenes that can be manipulated by a user. Subsequent to image capture, light field processing can be used to generate images using the captured image data along with the light field data. Various types of light field processing can be performed, including for example refocusing, aberration correction, changing the viewing perspective, and the like.

Existing techniques for downsampling images are, in general, not well suited to light field images. In light field images, pixels corresponding to a particular image area are not necessarily located adjacent to one another in the sensor array. As is described in related U.S. Utility application Ser. No. 12/703,367, referenced above, light field cameras include a microlens array that redirects light to individual elements of the image sensor based on the direction in which the light rays arrive at the microlens array. Thus a given image element (such as a point or region within a subject being photographed) may be represented by many disparately located pixels in the sensor array. The pixels representing the image element are, in effect, scattered throughout the sensor array by the microlenses in the microlens array. Conventional downsampling techniques are, in general, unable to combine these disparately located pixels in the sensor array. Thus, such techniques are, in general, unable to provide effective downsampled images that preserve the advantages and characteristics of the light field image, such as the ability to refocus or otherwise manipulate the image after it has been captured.

SUMMARY

According to various embodiments of the invention, improved downsampling techniques are employed, which can be applied to light field images and which preserve the ability to refocus (and otherwise manipulate) the image. For example, in various embodiments, the system and method of the present invention may downsample groups of pixels rather than individual pixels; such groups of pixels can be defined, for example, as disks of pixels. In one embodiment, such downsampling is accomplished by aggregating values for pixels having similar relative positions within adjacent disks (or other defined regions or pixel groups) within the image. In various embodiments, the system and method of the present invention can be adapted to downsample differing pixel tilings of such disks, and/or can be adapted to operate in connection with nonhomogeneous pixel patterns, such as Bayer patterns or the like. In various embodiments, the techniques described herein can be implemented at any of a number of different stages in the capture and processing of light field images.

In one embodiment, the system and method of the present invention enable downsampling of light field images having Cartesian disk arrangements with regular pixel tilings of homogeneous pixels, by downsampling the light field image such that spatial adjacencies are filtered (resulting in a reduction of spatial resolution) rather than filtering of angular adjacencies (which would result in reduction of angular resolution). This ensures that the refocusing capability of the resulting light field image is not reduced and/or adversely impacted. The system and method can operate in connection with various patterns of light field-image disks, including hexagonal arrangements and other arrangements.

In addition, in one embodiment, the system and method of the present invention can be adapted to downsample light field images with pixel tilings that differ from disk to disk.

In addition, in one embodiment, the system and method of the present invention can be adapted to downsample light field images with nonhomogeneous pixel patterns, such as a Bayer pixel pattern that is commonly used in image sensors.

The present invention also provides additional advantages, as will be made apparent in the description provided herein.

One skilled in the art will recognize that the techniques described herein can be implemented at various stages in the processing of a light field image that has been captured on an image sensor of a light field capture device. One skilled in the art will further recognize that the downsampling techniques described herein can be applied to other scenarios and conditions, and are not limited to the specific examples discussed herein. For example, the system of the present invention is not limited to light field pictures, but can also be applied to pictures taken by conventional cameras and other imaging devices, whether or not such pictures contain light field data.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

System Architecture

Figure 1A:
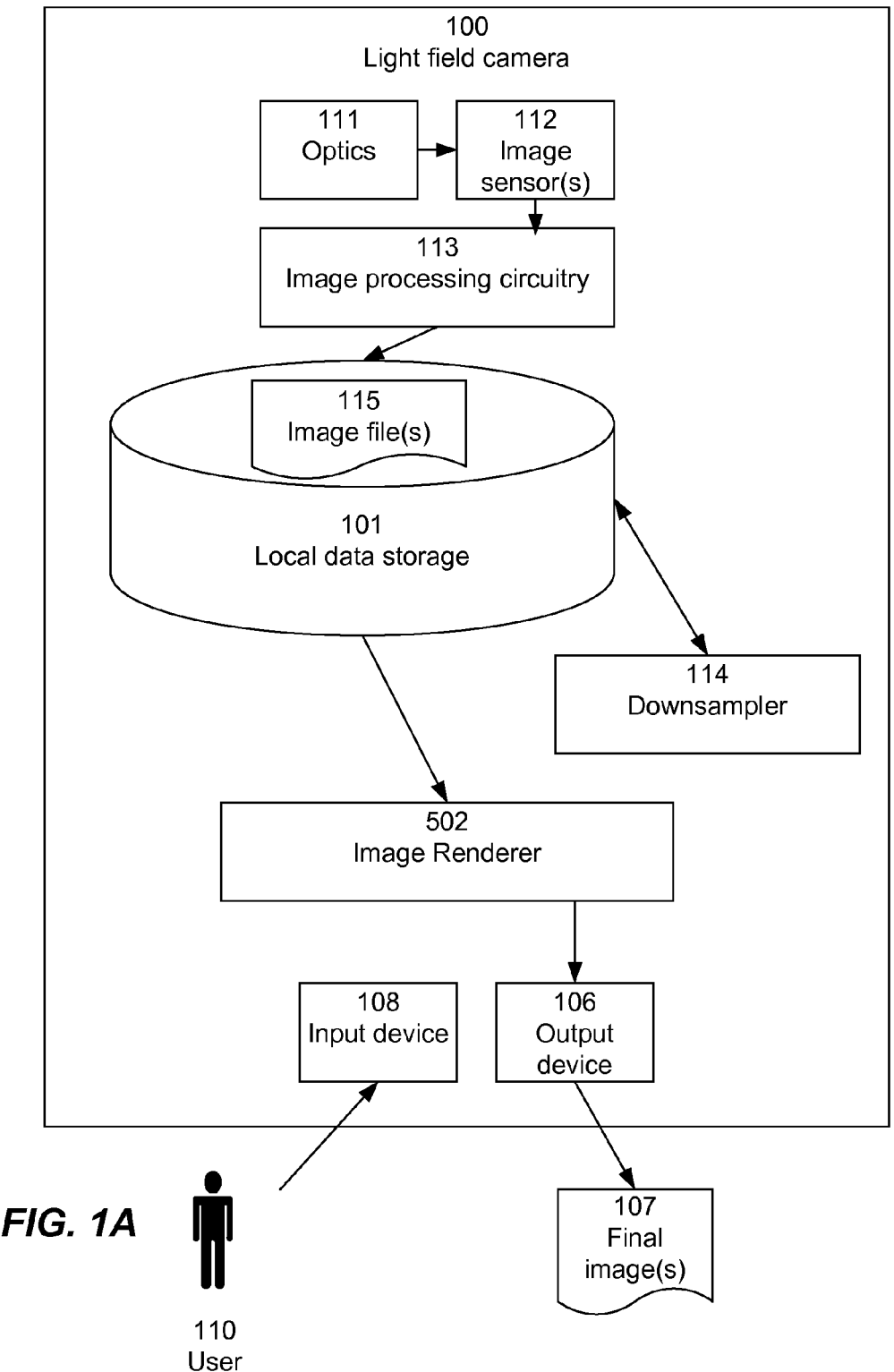
FIG. 1A depicts an architecture for implementing the present invention in a camera, according to one embodiment.

Referring now to FIG. 1A, there is shown an architecture for implementing the present invention in a light field camera 100 according to one embodiment. Camera 100 includes optics 111 (such as one or more lenses) for receiving and focusing an image; image sensor(s) 112, located in the optical image path for capturing the image as electronic data; and image processing circuitry 113 for processing the image data to generate image file(s) 115 stored in local data storage 101 at camera 100; however, in other embodiments, such data can be transmitted, output, and/or stored elsewhere. Data storage 101 may be implemented as any magnetic, optical, and/or electrical storage device for storage of data in digital form, such as flash memory, magnetic hard drive, CD-ROM, and/or the like.

In one embodiment, optics 111, image sensor(s) 112, and/or image processing circuitry 113 operate as described in related U.S. Utility application Ser. No. 12/703,367 for "Light Field Camera Image, File and Configuration Data, and Method of Using, Storing and Communicating Same," the entire disclosure of which is incorporated herein by reference.

Input device 108 receives input from user 110; such input may include commands for editing, deleting, transmitting, combining, and/or otherwise manipulating image file(s) 115. In general, input device 108 can receive input provided via physical buttons, touchscreen, rocker switch, dial, knob, graphical user interface, or any other suitable mechanism, or any combination thereof. One example of such a command may initiate a downsampling operation to be performed by downsampler 114 according to the techniques described herein. Alternatively, in other embodiments, such downsampling may be initiated automatically, such as when a need is detected for reducing the size of an image file 115. For example, downsampling may take place when an image file 115 is to be sent via a communications channel having limited bandwidth, or when an image file 115 is to be stored in a device having limited storage space.

In one embodiment, downsampler 114 is a software module that runs on a processor of camera 100. In other embodiments, downsampler 114 may be implemented as a hardware component. In FIG. 1A, downsampler 114 is shown as a component that operates on images stored in local data storage 101. In other embodiments, downsampler 114 may be implemented as part of image processing circuitry 113, or as part of image renderer 502, or as a separate component. For example, referring now briefly to FIG. 1D, there is shown an embodiment wherein downsampler 114 is implemented as part of the path between image sensor(s) 112 and image processing circuitry 113.

Image renderer 502 renders final image(s) 107 from image file(s) 115. Such rendering can be immediate or deferred. Output device 106 presents final image(s) 107 to user 110. For example, image file(s) 115 may contain light field data, while final image(s) 107 can be a "flattened" version of such images that omits the light field data for presentation on a conventional display screen.

Output device 106 may be an integrated display screen on camera 100, a separate display screen (not shown), and/or any other suitable device.

In some embodiments, camera 100 may include components (not shown) for transmitting image file(s) 115 and/or final image(s) 107 in any suitable data format and according to any suitable data transmission protocol. For example, such data can be transmitted via the Internet, or via a wired or wireless communications network, personal area network such as BlueTooth, cellular telephone network, pager network, or the like. For illustrative purposes, however, FIG. 1A depicts an architecture for implementing the present invention in a stand-alone arrangement, without reference to other components.

Figure 1B:
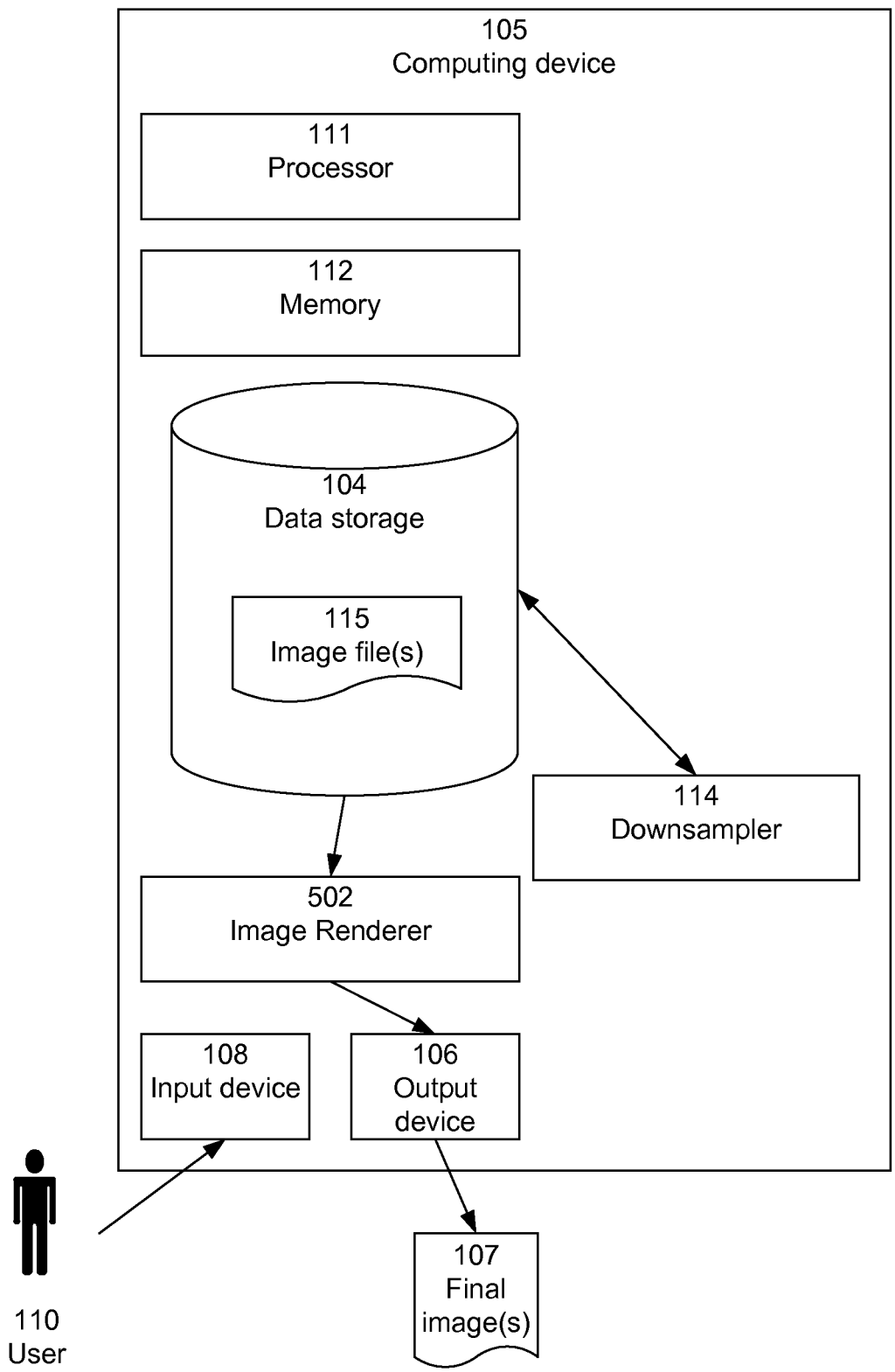
FIG. 1B depicts an architecture for implementing the present invention in a computing device, according to one embodiment.

Referring now to FIG. 1B, there is shown an alternative architecture for implementing the present invention in a computing device 105, according to one embodiment. In various embodiments, client computing device 105 may be any electronic device, including for example and without limitation, a desktop computer, laptop computer, personal digital assistant (PDA), cellular telephone, smartphone, music player, handheld computer, tablet computer, kiosk, game system, enterprise computing system, server computer, or the like. In one embodiment, computing device 105 runs an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on such devices. In one embodiment, client computing device 105 includes a network interface (not shown) for enabling communication via a network, and may also include browser software (not shown) for transmitting requests to a server and receiving responses therefrom.

Here, image file(s) 115 represent images previously collected from camera(s) and/or other data acquisition devices, and stored at data storage 104 of computing device 105. FIG. 1B illustrates that the techniques of the present invention can be practiced on image data without requiring the source of the image file(s) 115 to be present. Thus, for example, downsampler 114 may operate to downsample stored image file(s) 115 at any suitable time, such as for example when image file(s) 115 are to be transmitted and/or stored via channels and/or devices having limited bandwidth and/or storage.

User 110 interacts with computing device 105 via input device 108, which may include a mouse, trackpad, trackball, keyboard, and/or any of the other input components mentioned above. Under the direction of input device 108, computing device 105 processes and/or manipulates image file(s) 115, including, if applicable, downsampling as performed by downsampler 114.

Figure 1C:
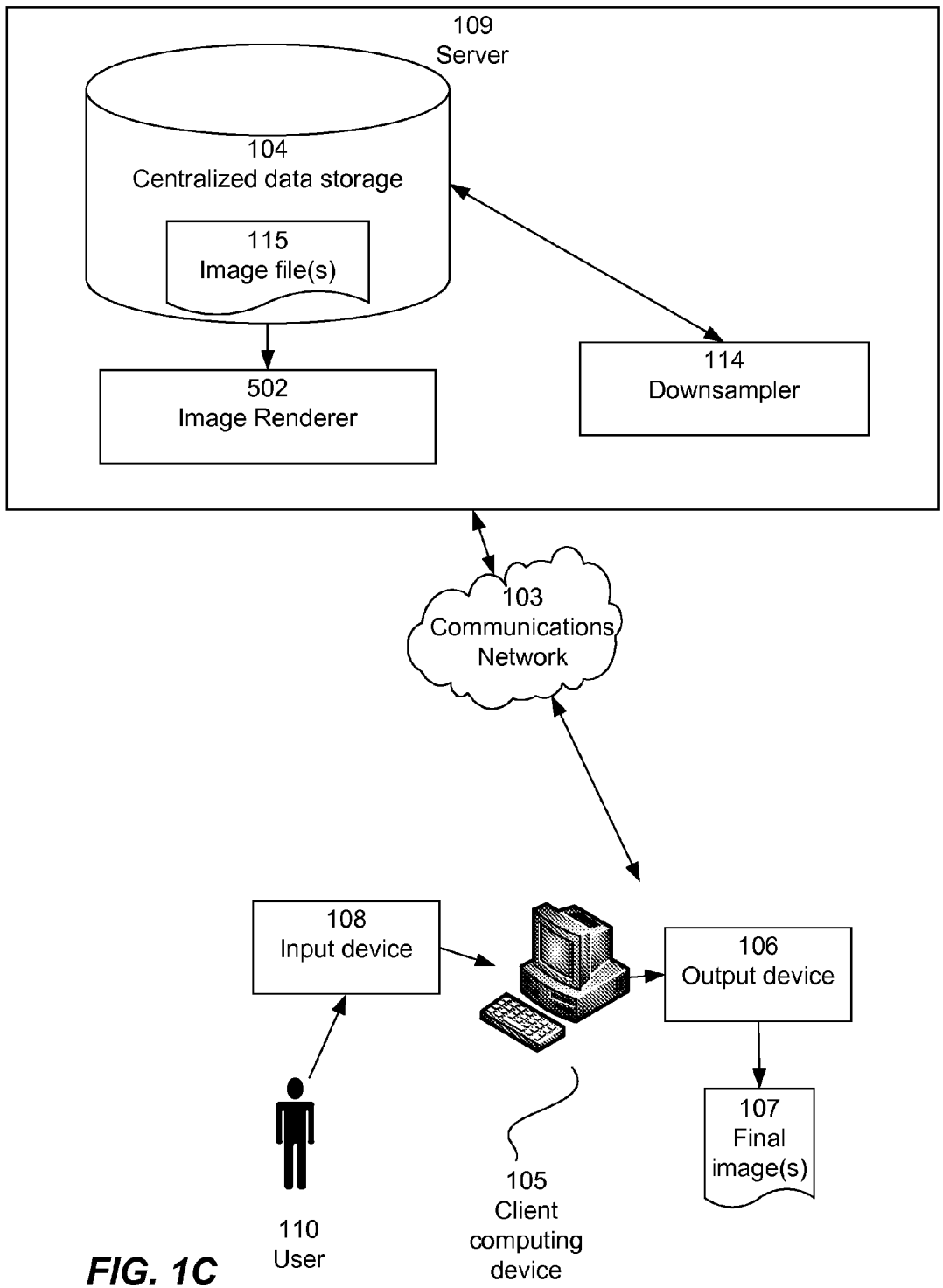
FIG. 1C depicts an architecture for implementing the present invention in a client/server environment, according to one embodiment.
Figure 1D:
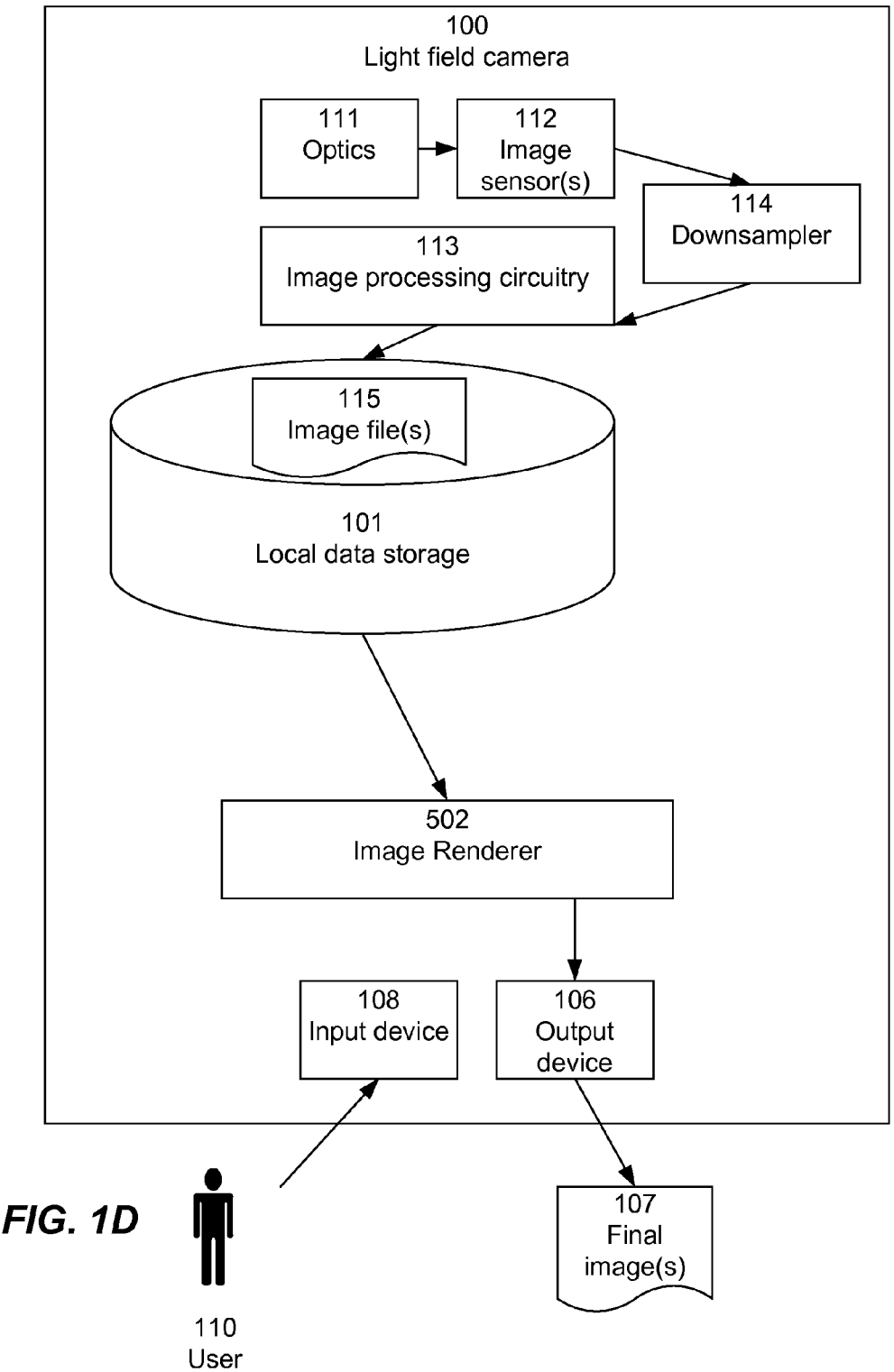
FIG. 1D depicts an architecture for implementing the present invention in a camera, wherein a downsampler is implemented in the path between an image sensor and image processing circuitry, according to one embodiment.

Referring now to FIG. 1C, there is shown an alternative architecture for implementing the present invention in a client/server environment, according to one embodiment. Image file(s) 115 are stored at server 109. Image file(s) 115 may be transmitted to server 109 from a camera, computer, or any other device via any suitable mechanism; one example is communications network 103 such as the Internet. In such an embodiment, image file(s) 115 can be transmitted using HTTP and/or any other suitable data transfer protocol. Client computing device 105 is communicatively coupled with server 109 via communications network 103 such as the Internet.

In one embodiment, client computing device 105 includes a network interface (not shown) for enabling communication via a network, and may also include browser software (not shown) for transmitting requests to a server and receiving responses therefrom. In this manner, user 110 can initiate downsampling or other operations on image file(s) 115 stored at server 109.

User 110 interacts with computing device 105 via input device 108, which may include a mouse, trackpad, trackball, keyboard, and/or any of the other input components mentioned above. Under the direction of input device 108, computing device 105 transmits corresponding request(s) to process and/or manipulate image file(s) 115 stored at server 109.

Centralized data storage 104 is shown as being located at server 109, although it can also be implemented locally at computing device 105 or at any suitable location. Accordingly, the specific architecture depicted in FIG. 1C is not necessary to practice the present invention. In one embodiment, computing device 105 communicates with server 109 via communications network 103 according to well known protocols.

In one embodiment, computing device 105 of FIG. 1C includes the same components as described above in connection with FIG. 1B.

In various embodiments, the techniques of the present invention can be implemented in a downsampler 114 that operates on image file(s) 115. As described above, such downsampler 114 can be a software component that runs on a processor of a camera 100, computing device 105, or other device. Alternatively, such downsampler 114 can be implemented as circuitry and/or other hardware that can be configured to perform the steps described herein. Such software, circuitry and/or other hardware may include, for example, one or more processors, one or more state machines, one or more processors implementing software, one or more gate arrays, programmable gate arrays and/or field programmable gate arrays, operating either singly or in any suitable combination with one another.

Figure 5:
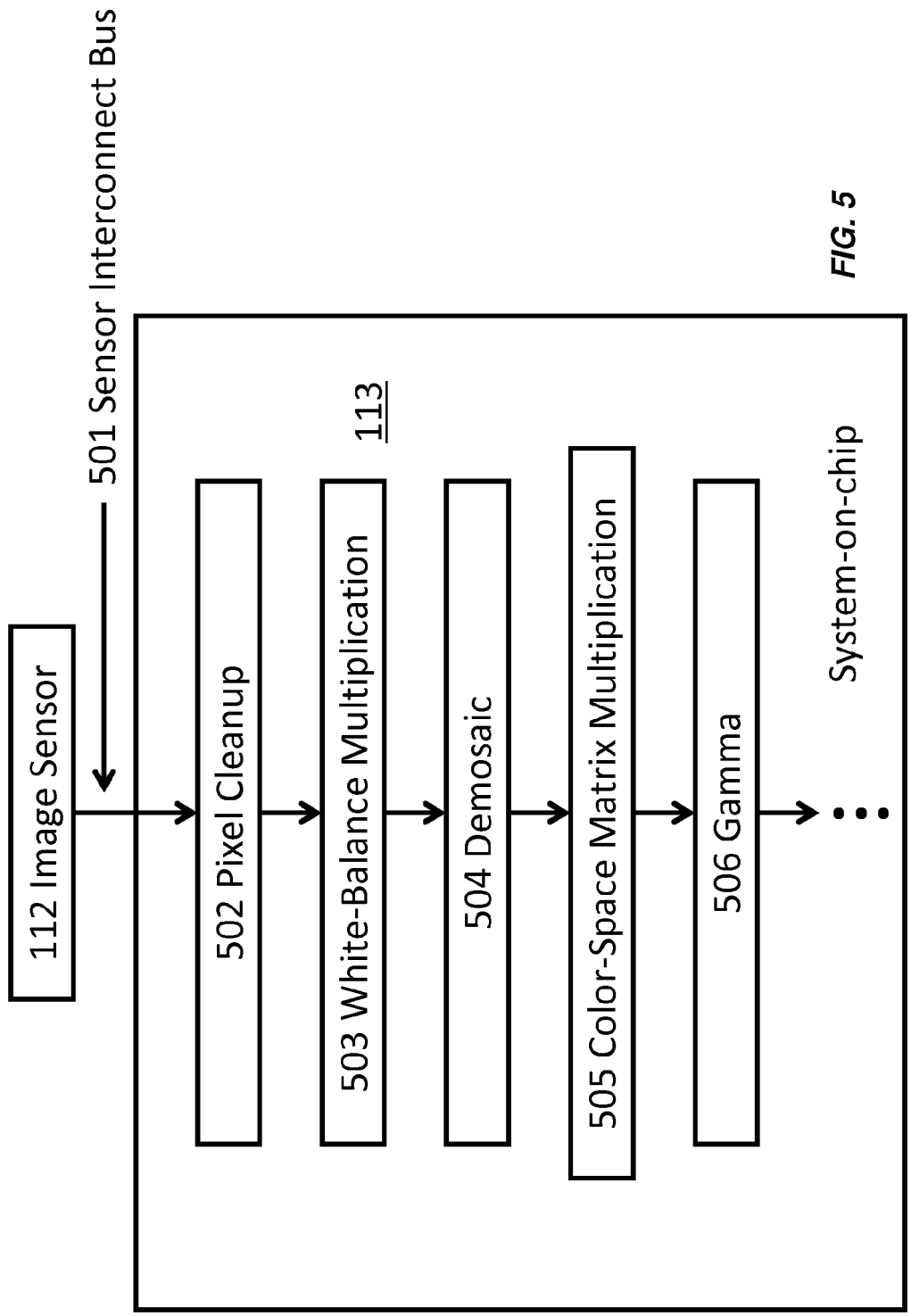
FIG. 5 depicts additional details of the operation of image processing circuitry according to one embodiment.

Downsampler 114 can also be incorporated in image processing circuitry 113 itself. Referring now to FIG. 5, there are shown additional details for image processing circuitry 113 according to one embodiment, wherein such circuitry 113 is included in downsampler 114 and is implemented as a system-on-a-chip. One skilled in the art will recognize, however, that other architectures are possible.

For illustrative purposes, image processing circuitry 113 is depicted in FIG. 5 in terms of a sequence of operating stages that may process and manipulate light field images captured by image sensor(s) 112 and transferred to image processing circuitry 113 via any suitable communications means such as sensor interconnect bus 501. As depicted in FIG. 5, the light field image is then operated upon by a sequence of processing stages, such as for example pixel cleanup 502, white-balance multiplication 503, demosaic 504, color-space matrix multiplication 505, gamma 506, and the like. Any suitable mechanisms can be used for any such operations, as are well known in the art.

In various embodiments of the present invention, the downsampling methods taught herein may be implemented at any of these stages, and/or other stages, whether such stages are performed by image processing circuitry 113 or by any other component.

In one embodiment, the downsampling techniques described herein are performed at image sensor 112 itself, so as to reduce the bandwidth required to transfer light-field images from image sensor 112 to image processing circuitry 113. For example, image sensor 112 may be configured with an embedded processor which performs the downsampling as taught herein. In such an embodiment, the processing circuitry may be considered to be distributed, such that some aspects of image processing are performed on image sensor 112, while other aspects are performed by an embedded processor.

In another embodiment, image sensor 112 may be configured such that downsampling, as taught herein, is implemented throughout its pixel array. For example, wiring may be provided within sensor array to allow pixel values to be efficiently transported and averaged. Such wiring may be divided into (potentially overlapping) zones that are sufficient to connect all pixels within disks whose pixels are to be averaged, according to the techniques described herein. In one exemplary embodiment, such wiring may be implemented as a ring bus, using serial communication to transfer packetized pixel data. Other configurations and embodiments may instead be used.

In one exemplary embodiment, the system and method of the present invention are implemented in connection with a combined still/video light-field image sensor. In such an embodiment, image sensor 112 can capture a high-resolution light-field image, and either transfer the image without downsampling through sensor interconnect bus 501, or it can downsample the image according to the techniques described herein before transferring the image through sensor interconnect bus 501. For example, still images can be transferred without downsampling, while video (which may be expected to be at lower resolution) can be transferred after being downsampled. In this manner, the system of the present invention can satisfy requirements both still light-field image capture (at higher resolution) and video capture (at lower resolution).

In another embodiment, downsampling can be performed at any of the stages 502 through 506 depicted in FIG. 5, or at any other suitable step. In yet another embodiment, downsampling can be performed by a component that is not part of image processing circuitry 113 and may not even be included in the same device as image processing circuitry 113.

The techniques described herein may be implemented in connection with any suitable method of processing image file(s) 115 such as, for example, image file(s) 115 representing light field images. In addition, the system and method of the present invention can be implemented on or in connection with image file(s) 115 captured via any camera or any other form of image capture device or other data acquisition device. Such a data acquisition device can be any device or system for acquiring, recording, measuring, estimating, determining and/or computing data representative of a scene, including but not limited to two-dimensional image data, three-dimensional image data, and/or light field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable data acquisition device.

Method of Operation

In various embodiments, the system and method of the present invention operate to transform light field images or digital files representing light field images (referred to herein as light field image files, or simply image files). Light field images are captured by light field capture devices, including but not limited to capture devices such as those described in related U.S. Utility application Ser. No. 12/703,367 for "Light Field Camera Image, File and Configuration Data, and Method of Using, Storing and Communicating Same," the entire disclosure of which is incorporated herein by reference, and further described in Ng et al., "Light-Field Photography with a Hand-Held Plenoptic Capture Device," Technical Report CSTR 2005-02, Stanford Computer Science.

Figure 6:
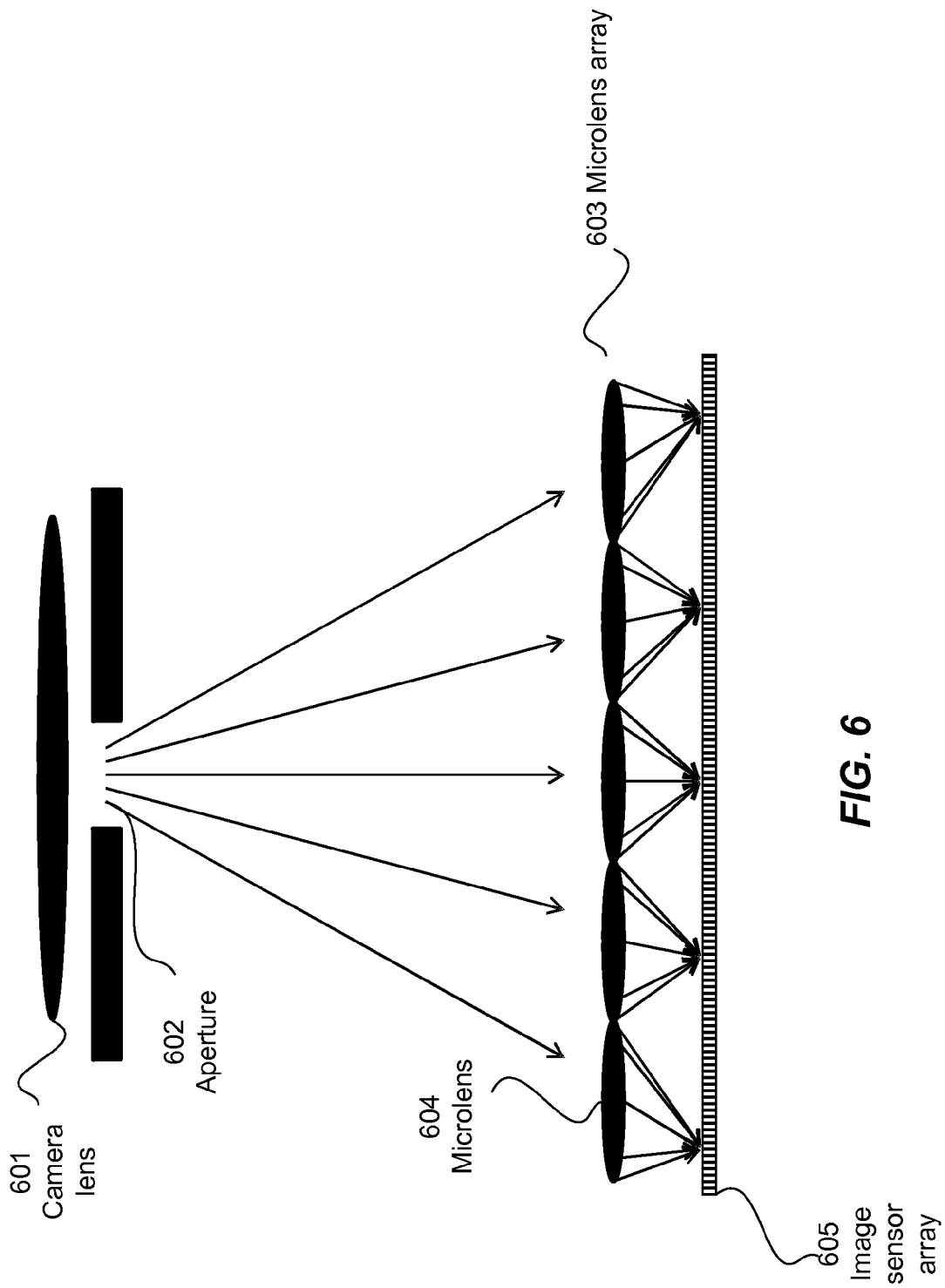
FIG. 6 depicts an example of a light field image capture apparatus according to one embodiment.

As described in the above-referenced related U.S. Utility Application, light field capture devices include a microlens array situated between the aperture and the image sensor array. Referring now to FIG. 6, there is shown an example of a light field image capture apparatus as it may be implemented in a light field camera 100 for capturing light field images that can be processed according to one embodiment of the present invention. Light rays pass through camera lens 601 and aperture 602, to be directed toward microlens array 603. Microlens array 604 includes a plurality of microlenses 604 (or lenslets), each of which directs a projection of aperture 602 to a region of image sensor array 605. The resulting light field image as captured at array 605 includes a plurality of projections of aperture 602, each projection taken from a different vantage point on the capture device focal plane, as represented by the different positions of microlenses in the microlens array. These projections, which may be circular or any other shape, are referred to herein as disks.

The apparatus depicted in FIG. 6 facilitates the capture of light field images that include four dimensions of information describing light rays arriving at the capture device focal plane. Two spatial dimensions (herein referred to as x and y) are represented by the disks themselves. Two angular dimensions (herein referred to as u and v) are represented as the pixels within an individual disk. The spatial dimensions represent spatial positions of the light rays arriving at the focal plane, since light rays arriving at different locations on the microlens array 603 will be directed by different microlenses 604. The angular dimensions represent the angles at which the light rays arrive at a particular microlens 604, since light rays arriving at the same microlens 604 but at different angles will be directed to different pixels within the same disk.

For example, the spatial resolution of a light-field image with 120,000 disks, arranged in a Cartesian pattern 400 wide and 300 high, is 400×300. The angular resolution of a light-field image with 100 pixels within each disk, arranged as a 10×10 Cartesian pattern, is 10×10. This light-field image has a 4-D (x,y,u,v) resolution of (400,300,10,10).

Figure 2A:
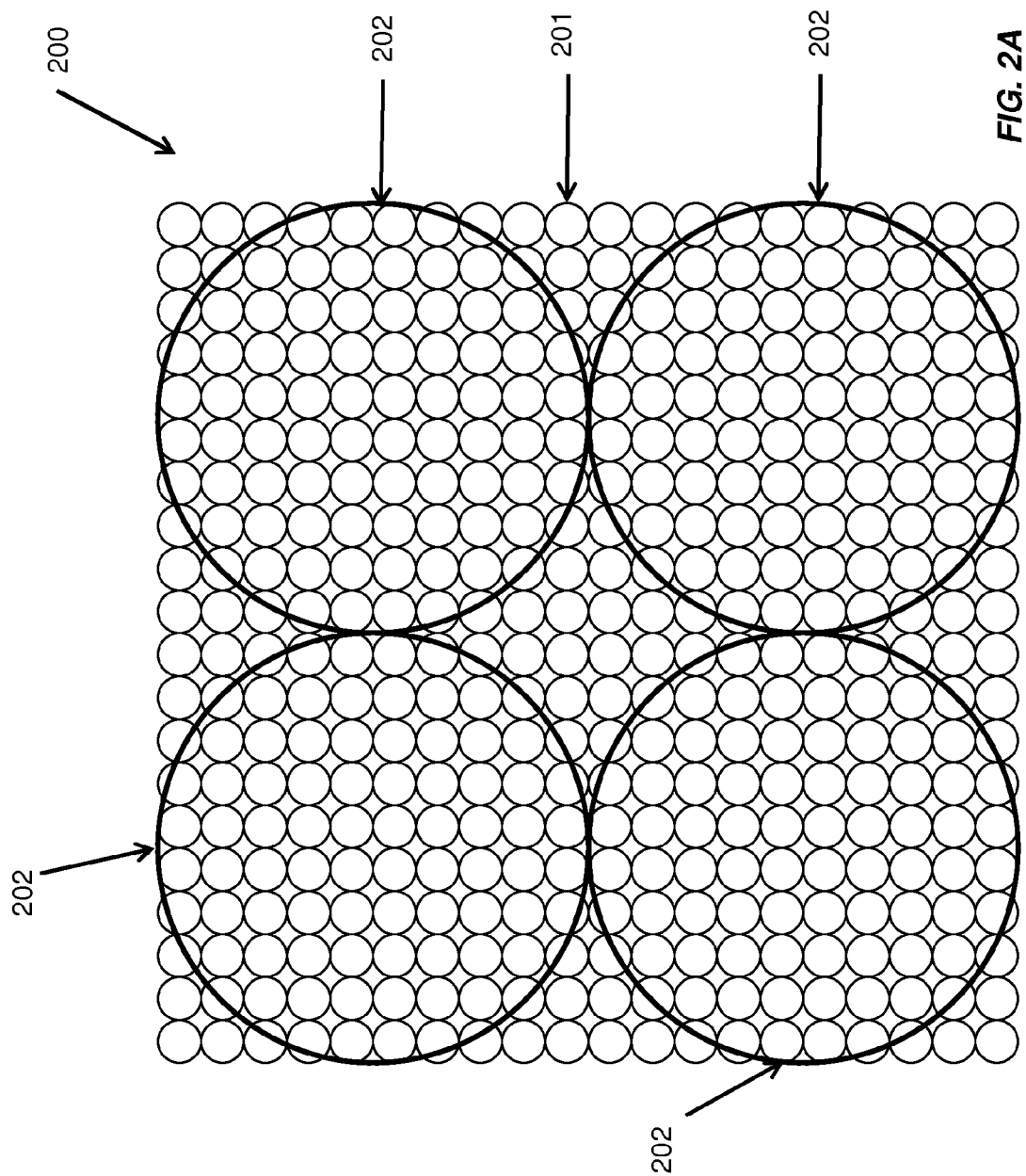
FIG. 2A depicts an example of a portion of a light field image as represented in a digital image storage device, according to one embodiment.

Referring now to FIG. 2A, there is shown an example of a portion of a light field image 200 as represented in a digital image storage device, according to one embodiment. Light field image 200 includes any number of individual pixels 201 representing image data captured at image sensor array 605. In the example, a 20-pixel by 20-pixel portion of light field image 200 is shown. Four disks 202 are depicted, in a square (Cartesian) configuration. Each disk 202 corresponds to an individual microlens 604 in microlens array 603, and contains a number of pixels 201 representing image data that was directed to image sensor array 605 by that microlens 604. The depiction of disks 202 as line-drawn circles is schematic and is provided for clarity of illustration only; an actual light-field image 200 may have lighted pixels 201 within the boundaries of each disk 202, dark pixels 201 between disks 202, and partially illuminated pixels 201 that straddle the boundaries of the disks 202, or any other arrangement of lighted pixels 201. One skilled in the art will recognize that any number of such disks 202 can be provided, and that, though represented as disks 202 in FIG. 2A, such subdivisions of light field image 200 corresponding to individual microlens 604 in microlens array 603 can be of any shape and can be arranged in any suitable manner.

Figure 2B:
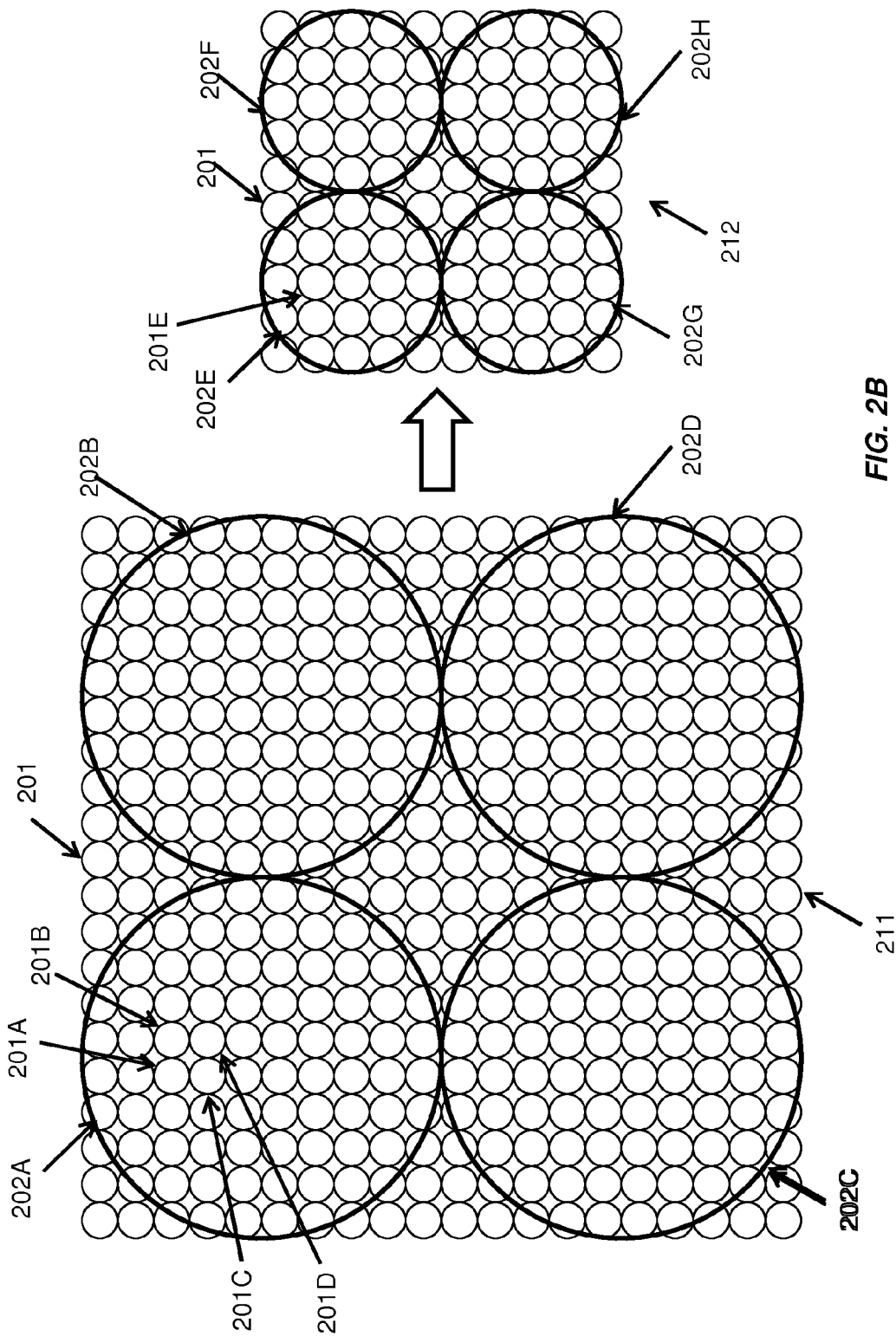
FIG. 2B depicts an example of an attempt to apply a conventional downsampling technique to a light field image.

It may be desirable to downsample light field images 200 for the same reasons as it is for conventional non-light-field images. For example, it may be desirable to reduce resolution so as to reduce transmission bandwidth and storage size, or for any other applicable reason. Referring now to FIG. 2B, there is shown an example of the problems associated with application of a conventional downsampling technique to a light field image 200. In this example, original image 211, which may be a high-resolution light field image, is transformed into downsampled light field image 212 using conventional downsampling wherein each pixel 201 in downsampled image 212 is determined by combining values of a small group of adjacent pixels 201 in original image 211. For example, a filtering or averaging technique can be used to combine pixels 201 in generating values for downsampled image 212. In the example of FIG. 2B, the 20×20-pixel region of original image 211 is transformed to a 10×10-pixel region of downsampled image 212. Each pixel 201 in downsampled image 212 may be computed, for example, from a 2×2-pixel region in original image 211. Thus, in FIG. 2B, pixels 201A-201D of original image 211 are combined into one pixel 201E in downsampled light field image 212, representing the average value of pixels 201A-201D. The resulting 10×10-pixel region of downsampled image 201 contains four disks 202E-202H, each of which is a half-resolution version of the corresponding disk 202A-202D in original image 211.

For a conventional (non light field) image, such downsampling would result in an effective reduction in the total number of pixels 201 of the image. In a light-field image, however, adjacent pixels 201 within a disk 202 correspond to angular, rather than spatial, information; therefore, conventional downsampling techniques result in a reduction in angular dimension, rather than in spatial dimension. The conventional technique fails to reduce spatial resolution because it determines a value for each pixel 201 in original image 211 using pixels 201 from a single disk 202A, while ignoring available image data from other disks 202B-202D, even though some image data on other disks 202B-202B corresponds to the same point on the subject of the image.

For example, if each 2×2 pixel grouping in a (400,300,10, 10) high-resolution light-field image is reduced to a single pixel in the downsampled image, the 4-D dimensions of this image would be (400,300,5,5). Angular resolution has been reduced, without reducing spatial resolution. The result of such reduced angular information is a corresponding reduction in refocusing range and resolution.

In many applications, however, it is desirable to reduce spatial resolution rather than angular resolution, so as to preserve the refocusing capability of the light field image 200. Accordingly, various embodiments of the present invention provide techniques by which a light field image 200 is downsampled so that its spatial dimensions are reduced, while its angular resolution remains unchanged. Because disks 202 are the elements of spatial resolution, the system and method of the present invention apply downsampling to adjacent disks 202, rather than adjacent pixels 201 within a disk 202. Such a methodology preserves refocusing capability while reducing spatial resolution.

According to one embodiment of the present invention, downsampling is performed by determining a value for each pixel 201 in downsampled light field image 212 based on values of pixels 201 that have the same (or similar) relative location within their respective disks 202 in original image 211. The result is a reduction in the number of disks 202 in the image, but not in the number of pixels 201 per disk 202. In this manner, spatial resolution is reduced but angular resolution is preserved, so that refocusing capability is not reduced.

Figure 2C:
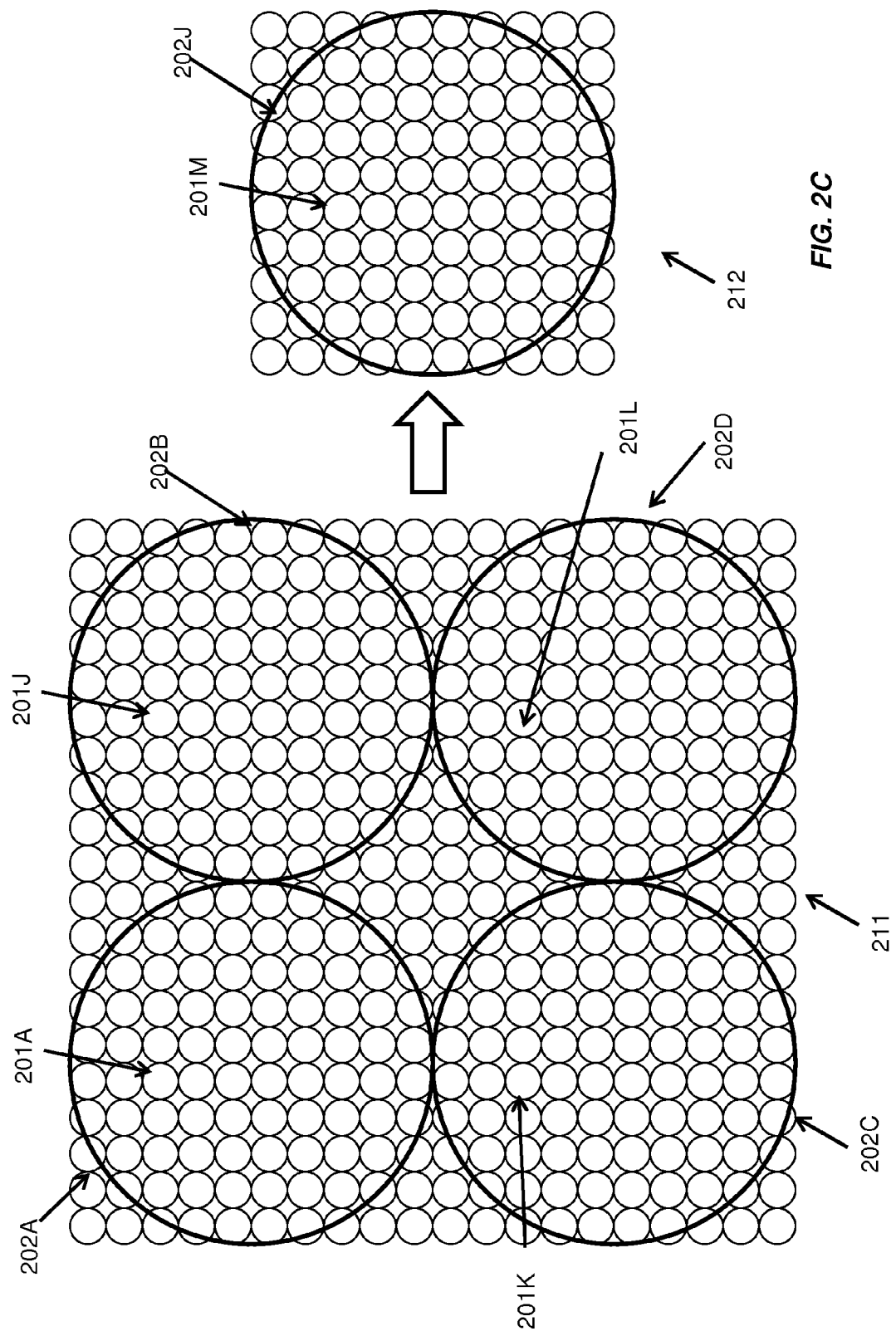
FIG. 2C depicts an example of an improved downsampling technique as applied to a light field image, according to one embodiment of the present invention.

Referring now to FIG. 2C, there is shown an example of such an improved downsampling technique as applied to original image 211, according to one embodiment of the present invention. Here, 2:1 light-field downsampling is performed, but each pixel 201 in the 10×10-pixel downsampled light-field image 212 is computed from four pixels 201 with the same relative location in disks 202 in the high-resolution light-field image. Thus, the value of pixel 201M, located at a position in the fifth column and third row of the 10×10 region designated by disk 202J, is computed as the average value of four pixels 201A, 201J, 201K, 201L of original image 211, where each of those four pixels 201A, 201J, 201K, 201L is located at the same relative location in their respective disks 202A, 202B, 202C, 202D (each being in the fifth column and third row of its corresponding 10×10 disk 202 region).

Figure 7:
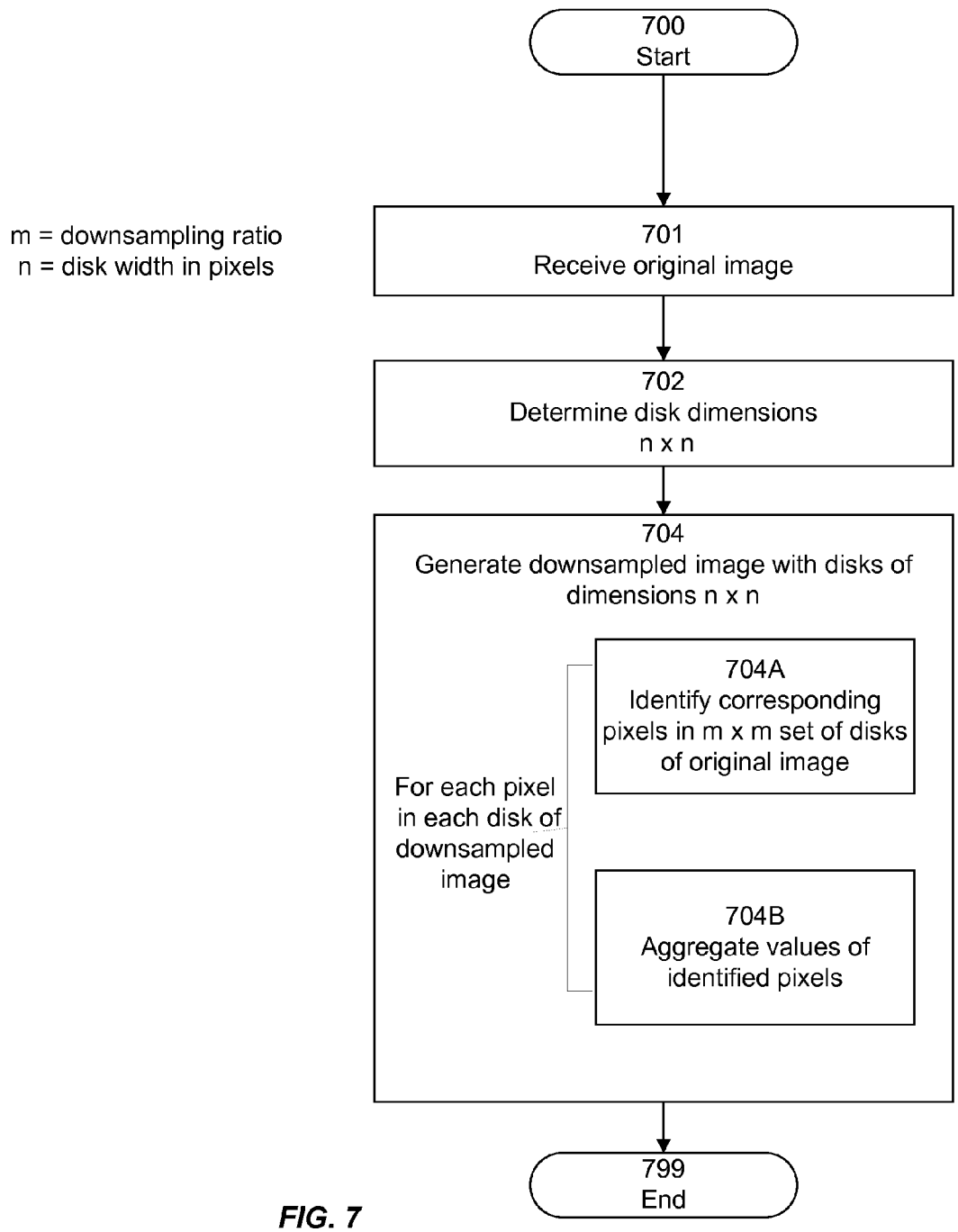
FIG. 7 is a flow diagram depicting a method of downsampling an image according to one embodiment.

Referring now to FIG. 7, there is shown a method for downsampling an image according to one embodiment, as it may be implemented in downsampler 114 or in any other software or hardware component. For purposes of the method depicted in FIG. 7, disk dimensions of both original image 211 and downsampled image 212 are assumed to be n pixels by n pixels, and the downsampling ratio is assumed to be m:1. In the example depicted in FIG. 2C, n=10 and m=2.

The method begins 700. Original image 211 is received 701. Dimensions n×n for disks 202 in original image 211 are determined 702. Downsampled image 212 having the same disk dimensions n×n is generated 704. In one embodiment, as described above, step 704 is performed as follows: For each pixel location in each disk 202 of downsampled image 212, a set of pixels 201 having the corresponding pixel locations in a group of m×m adjacent disks 202 of original image 211 is identified 704A. Then, pixel values for the set of pixels 201 are aggregated 704B (by averaging or by some other means) to obtain a value for corresponding pixel 201 in downsampled image 212. Once pixel values for all pixels in downsampled image 212 are determined in this manner, the method ends 799.

As described above, FIG. 2C depicts an example of such a method wherein n=10 and m=2. Pixel 201M is generated by aggregating values of pixels 201A, 201J, 201K, 201L, which all have corresponding pixel locations in their respective disks 202A, 202B, 202C, and 202D.

Adaptation to Differing Pixel Tilings of Disks

In the examples described above, all disks 202 in original image 211 were assumed to have the same pixel tilings. For example, FIG. 2C depicts an exact 10:1 ratio between sizes of disks 202 and pixels 201, resulting in a uniform 10×10-pixel tiling for every disk 202 in the light-field image. In general, where the disk-to-pixel size ratio is an integer value, disks 202 will have uniform tiling.

In one embodiment, the system and method of the present invention is able to operate in situations where the disk-to-pixel size ratio is not an exact integer value, causing disks 202 to vary in their pixel tilings. Two cases are discussed herein: one in which the disk-to-pixel size ratio is close to an integer value (near correspondence), and another in which it is not.

Near Correspondence

If the disk-to-pixel size ratio is not an exact integer value, but is suitably close to an integer value, then the tilings of disks 202 throughout the light-field image may vary substantially, but the tilings of adjacent disks 202 will be very similar.

In one embodiment, in such situations where there is near-uniform tilings in adjacent disks 202, downsampling can be performed in substantially the same manner as described above for uniform tilings. In one embodiment, the system of the present invention determines whether disk tiling is sufficiently uniform for adjacent disks 202, and, if so, performs downsampling in substantially the same manner as for uniform tilings.

Figure 8:
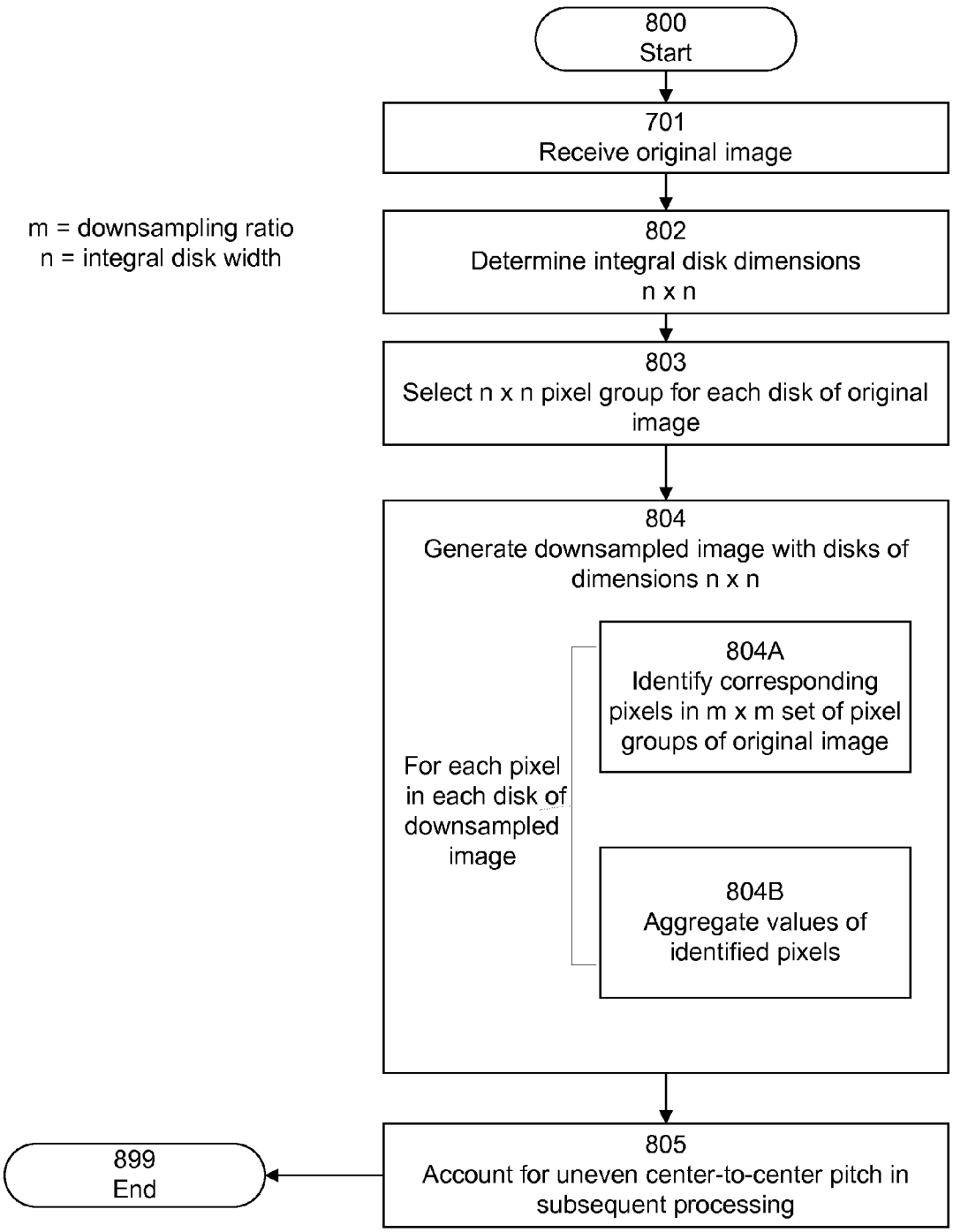
FIG. 8 is a flow diagram depicting a method of downsampling an image having near-uniform tilings in adjacent disks, according to one embodiment.

In one embodiment, an adjustment is performed to account for the non-uniformity in disk tilings. Referring now to FIG. 8, there is shown a method for downsampling an image having near-uniform tilings in adjacent disks 202, including an adjustment to account for the non-uniformity, according to one embodiment, as it may be implemented in downsampler 114 or in any other software or hardware component. For purposes of the method depicted in FIG. 8, disk dimensions of original image 211 are assumed to be close to, but not equal to n pixels by n pixels (so that the integral disk dimensions are in fact n pixels by n pixels). Disk dimensions of downsampled image 212 will be n pixels by n pixels, and the downsampling ratio is assumed to be approximately m:1.

Figure 3:
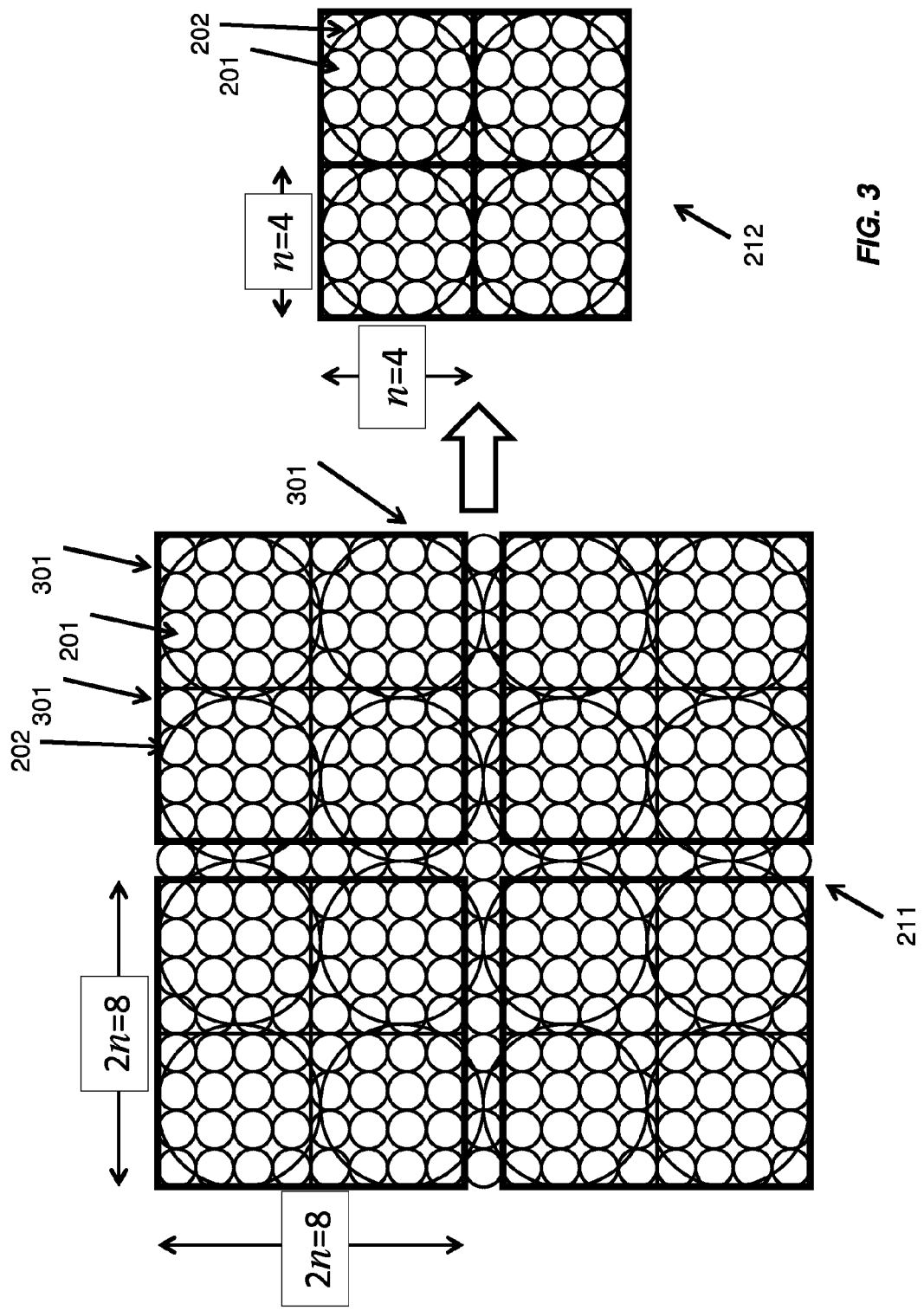
FIG. 3 depicts an example of a downsampling technique, wherein pixel tilings among disks in the light field image are near-uniform, according to one embodiment.

Referring also to FIG. 3, there is shown an example of an application of such a method. For illustrative purposes, FIG. 3 depicts the method including such an adjustment as it might be applied for a target downsampling ratio of 2:1, with disks 202 having dimensions of 4.25 pixels by 4.25 pixels (disk-to-pixel ratio of 4.25:1). However, one skilled in the art will recognize that analogous adjustments can be performed for other downsampling ratios.

The method begins 800. Original image 211 is received 701. An integral disk width n, measured in pixels, is determined 802. In one embodiment, this value is determined by rounding the disk-to-pixel size ratio to the nearest integer. In the example of FIG. 3, the disk-to-pixel size ratio is 4.25; therefore the integral disk width n is 4.

An n×n group 301 of pixels 201 is selected 803 for each disk 202. In one embodiment, this is performed by determining which such group 301 of pixels 201 best overlaps each disk 202. In the example of FIG. 3, since n=4, each group 301 corresponds to a disk 202 and has dimensions of 4 pixels by 4 pixels.

Downsampled image 212 having disk dimensions n×n is generated 804. In the example of FIG. 3, each disk 202 in downsampled image 212 has dimensions 4×4, and is generated from a set of four groups 301 of pixels in original image 211.

In one embodiment, as described above, step 804 is performed using a variant of the techniques described above: For each pixel location in each disk 202 of downsampled image 212, a set of pixels 201 having the corresponding pixel locations in adjacent groups 301 of pixels 201 of original image 211 is identified 804A. Then, pixel values for the set of pixels 201 are aggregated 804B (by averaging or by some other means) to obtain a value for corresponding pixel 201 in downsampled image 212. Thus, each pixel 201 in downsampled image 212 is determined by averaging the values for a number of pixels 201 having a corresponding position in adjacent groups 301 of pixels 201 (rather than disks 202) in original image 211.

In one embodiment, when tiling is near-uniform as described herein, the actual downsampling ratio will not exactly equal the target downsampling ratio. In the example of FIG. 3, the actual downsampling ratio is 17:8, or 2.125:1, rather than 2:1. In addition, some pixels 201 of original image 211 (namely, those that fall between sets of pixel groups 301) were ignored in generating downsampled image 212. In one embodiment, such inaccuracies can be accepted or compensated for, by any suitable means in subsequent processing 805. In addition, subsequent processing 805 can take into account the uneven center-to-center pitch of disks 202 in downsampled image 212.

In one embodiment, subsequent processing 805 includes any of a number of steps for compensating for inaccuracies in the downsampling ratio, uneven center-to-center pitch, and/or any other issues. During subsequent processing 805, each pixel 201 in downsampled image 212 specifies the geometry and color of a representative ray. This representative ray is a single ray that represents, generally, rays captured by a single pixel element of image sensor 112. Intersections of the representative rays with a virtual focal plane are computed, and then reconstructed into an image.

Light rays arrive at sensor 112 at different angles, depending on their path through microlens array and depending on the disk-to-pixel size ratio. When the disk-to-pixel size ratio is an exact integer value, the angles at which rays for m×m corresponding pixels arrive at sensor 112 are identical to one another; the same angle would apply to the representative ray assigned to the aggregated pixel 201 in downsampled image 212. When the disk-to-pixel size ratio is not an exact integer value, corresponding pixels 201 have slightly different representative rays, and the aggregated pixel 201 in downsampled image 212 has a representative ray that is an aggregate of the representative rays in these corresponding pixels 201. In one embodiment, this aggregated representative ray is computed for each pixel 201 in downsampled image 212, and its angular information is then used during subsequent projection.

The method then ends 899.

Resampling

If the disk-to-pixel size ratio is not close to an exact integer, tilings of adjacent disks 202 are likely to be dissimilar, so that the above-described technique may not provide satisfactory results. In this case, disks 202 may be resampled before downsampling takes place, with such resampling being performed on a grid that ensures exact and/or suitable correspondence. In one embodiment, such resampling can be performed whether or not the disk-to-pixel size ratio is close to an exact integer.

Figure 4:
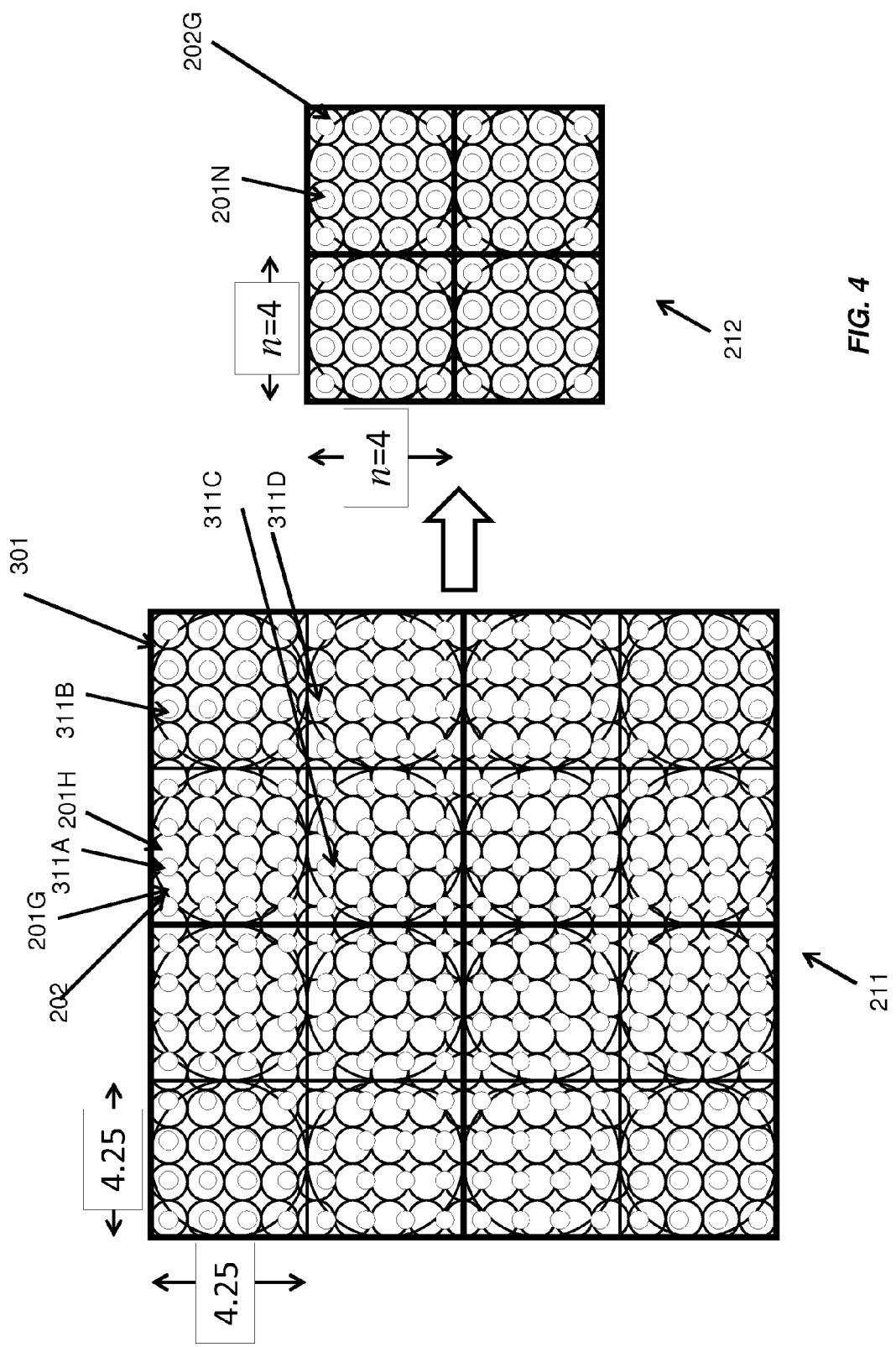
FIG. 4 depicts an example of a resampling and downsampling technique, wherein pixel tilings among disks in the light field image are non-uniform, according to one embodiment.
Figure 9:
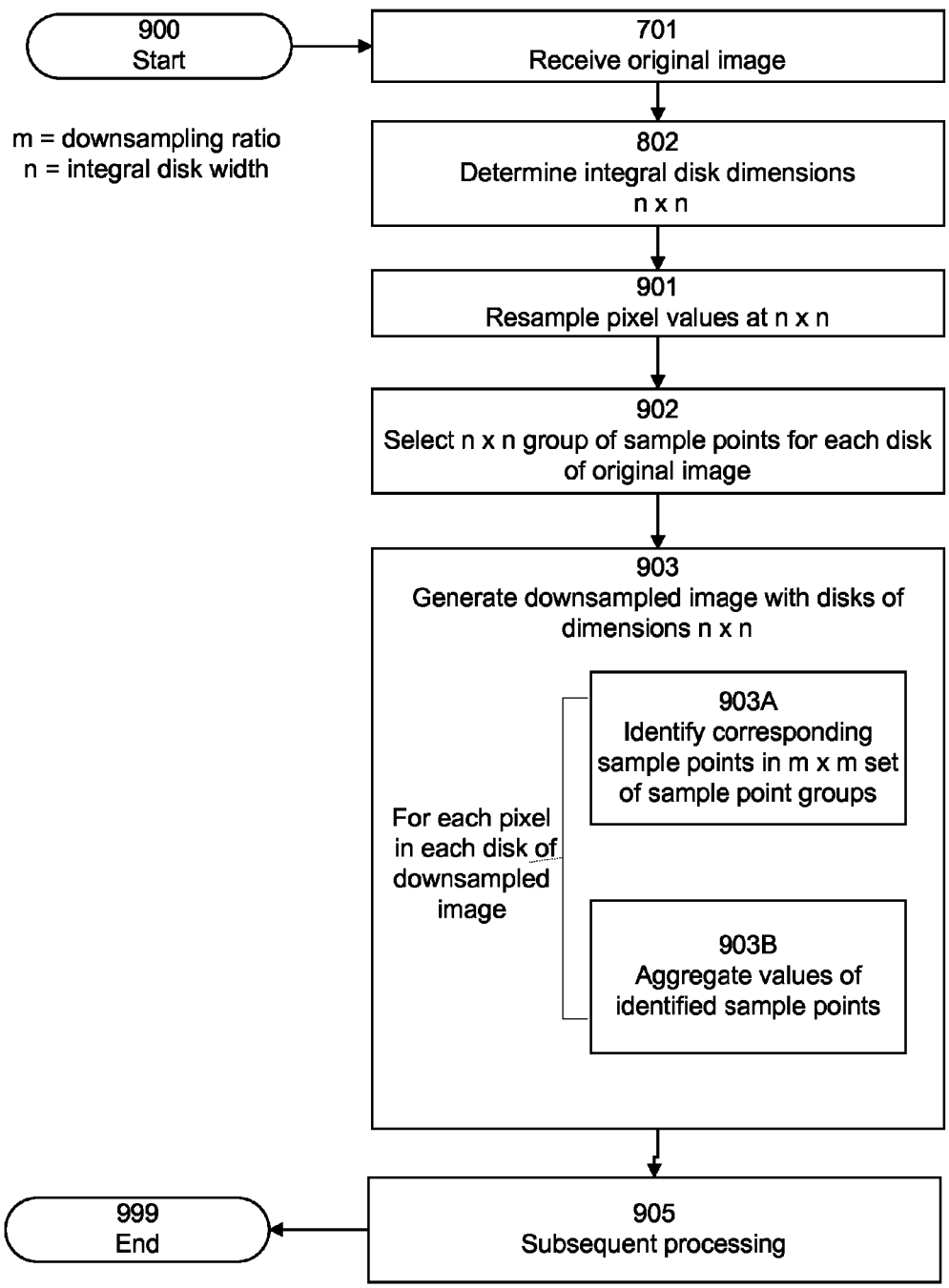
FIG. 9 is a flow diagram depicting a method of resampling and downsampling an image having non-uniform tilings, according to one embodiment.

Referring now to FIG. 9, there is shown a method of a resampling and downsampling technique, wherein pixel tilings among disks in the light field image are non-uniform, according to one embodiment. Referring now also to FIG. 4, there is shown an example of an application of such a method. For illustrative purposes, disks 202 are shown having dimensions of 4.25 pixels by 4.25 pixels (disk-to-pixel ratio of 4.25:1).

The method begins 900. As described above in connection with FIG. 8, original image 211 is received 701, and an integral disk width n, measured in pixels, is determined 802. In one embodiment, this value is determined by rounding the disk-to-pixel size ratio to the nearest integer. In the example of FIG. 4, the disk-to-pixel size ratio is again 4.25; therefore the integral disk width n is 4. Thus, the integral pixel width of disks 202 in the downsampled image will be n=4.

Prior to downsampling, pixel values for the region corresponding to each disk 202 of original image 211 are resampled 901 (or sub-sampled) on a regular n×n grid of sample points. In one embodiment, this step is performed as follows: for each sample point, a value is computed based on a weighted average of the values of nearby pixels, using techniques that are known in the art. The average can be weighted according to the exact position of the sample point with respect to the nearby pixels. In one embodiment, bilinear filtering of the four nearest pixels, or any other suitable mechanism, may be performed.

In the example, of FIG. 4, each disk 202 corresponds to a 4.25×4.25-pixel square region 301 of original image 211. Since n=4 in this example, each region 301 is resampled on a regular 4×4 grid of sample points 311. As described above, a value is determined for each sample point 311 based on values of nearby pixels. For example, a value for sample point 311A is determined as a weighted average of the values for nearby pixels 201G and 201H.

Once regions 301 have been resampled 901, an n×n group 301 of sample points 311 is selected 902 for each disk 202. Downsampled image 212 having disk dimensions n×n is then generated 903. In the example of FIG. 4, each disk 202 in downsampled image 212 has dimensions 4×4.

In one embodiment, step 903 is performed as follows: For each pixel location in each disk 202 of downsampled image 212, a set of sample points 311 having the corresponding pixel locations in adjacent groups 301 of sample points 311 in original image 211 is identified 903A. Then, sample point values for the set of sample points 311 aggregated 903B (by averaging or by some other means) to obtain a value for corresponding pixel 201 in downsampled image 212. Thus, each pixel 201 in downsampled image 212 is determined by averaging the values for a number of sample points 311 having a corresponding position in adjacent groups 301 of sample points 311 in original image 211.

For example, in FIG. 4, the value for pixel 201N in downsampled image 212 is determined by averaging the values for sample points 311A, 311B, 311C, and 311D, since those four sample points occupy the same position within their respective groups 301 as does pixel 201N in its disk 202G.

In one embodiment, subsequent processing 905 can be performed on the result of step 903. For example, in one embodiment, representative rays are computed for each resample location. These representative rays are then aggregated to generate representative rays for each pixel 201 in downsampled image 212, as described above in connection with FIG. 8. Again, the angular information of each representative ray is then used during subsequent projection.

The method then ends 999.

Adaptation to Nonhomogeneous Pixel Patterns

The above description can be applied to embodiments wherein all pixels in original image 211 convey the same type of color information: for example, they may all convey intensity values, or they may convey color information in the form of triples of red, green, and blue intensities, or the like. In one embodiment, the system and method of the present invention can also be applied to light-field images that have a regular mosaic of pixels of different types. For example, sensor(s) 112 of camera 100 may capture values representing three different types of color information, such as red intensity, green intensity, and blue intensity. In one embodiment, the system and method of the present invention can take into account the possibility that pixels of the same type may be combined, but those of different types cannot generally be combined.

For example, if original image 211 has even-integer disk-to-pixel size ratios, and contains information for three colors (such as red pixels, green pixels, and blue pixels), pixels of the same color will be found at corresponding positions in adjacent disks 202. Thus, these same-color pixels can be combined, in a manner similar to that described above, to obtain the corresponding color value for the pixel at the corresponding position in downsampled image 212.

In other situations, pixels of original image 211 having different color values may be combined to generate new color values. For example, a set of pixels to be combined may include two green pixels, one red pixel, and one blue pixel. The resultant pixel in downsampled image 212 might take the average of the two green pixel intensities as its green value, the red-pixel intensity as its red value, and the blue-pixel intensity as its blue value.

In one embodiment, the system and method of the present invention can handle non-uniform pixel tilings containing multiple color values, i.e., nonhomogeneous pixel mosaics. The integer-valued pixel width of disks 202 is computed as described above in connection with FIG. 8. From this pixel width n, the dimensions of groups 301 of pixels 201 are computed as mn×mn, where m is the downsampling ratio, as described above. Groups 301 of pixels 201 of these dimensions are selected from original field image 211 to best fit the disks, as described above in connection with FIG. 8.

In one embodiment, if n is an integer multiple of m, pixel groups 301 are downsampled as described above in connection with FIG. 7. Otherwise, pixel groups 301 are downsampled as described above in connection with FIG. 8.

In another embodiment, resampling can be performed on the separate color values, in a manner analogous to that described in connection with FIG. 9.

Adaptation to Various Disk Patterns

In various embodiments, the techniques described herein can be applied to patterns of disks other than square patterns. For example, disks 202 in a light-field image 211 may be arranged in a hexagonal pattern. Pixels in downsampled image 212 are computed using pixel values at corresponding locations within adjacent disks 202 in image 211, in a manner analogous to that described above for square-patterned disks 202. If the same general arrangement of disks is being maintained, such pixels can easily be identified. If the arrangement of disks is being changed, for example from hexagons to squares, regular tiling of the disk pattern may not be possible, in which case resampling techniques such as those taught in connection with FIG. 8 may be employed.

In another embodiment, disks 202 in original image 211 may be combined in triangular sets of three. In this case, pixels 201 in each disk 202 of downsampled image 212 may be computed as the average of three adjacent disks 202 in original image 211. If there is no pixel-to-pixel correspondence between the three disks 202 in original image 211, resampling techniques such as those taught in connection with FIG. 8 may be employed.

In another embodiment, disks 202 may be combined in hexagonal sets of seven. In the case of hexagonal sets of seven disks 202, in one embodiment, pixels 201 in each disk 202 of downsampled image 212 may be computed as an aggregation of pixels 201 at corresponding locations in the seven disks 202 of original image 211. In this case, adjacent disks 202 in downsampled image 212 may share disks 202 in original image 211, and more complex weightings of disks 202 in original image 211 may be computed. For example, if each of the six peripheral disks 211 in the seven-disk set is shared by three sets, it may be weighted with ⅓ the value of the central disk 211 in the seven-disk set. Thus, in such an example, the center disk 202 might be assigned a weight of ⅓, while each of the six peripheral disks 202 might be assigned a weight of ⅑, for a total of one.

In some situations, triangle sets and hexagonal sets may result in downsampled disks 202 having pixel patterns that may not be readily assembled into a two-dimensional image. Rather than attempting this reassembly, in one embodiment, the system and method of the present invention may treat each downsampled disk 202 as an individual image.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of generating a downsampled image from a first image, comprising:
    at a processor, receiving a first image, the first image comprising a plurality of regions, each region comprising a plurality of pixels;
    at the processor, combining pixel values of pixels within a plurality of adjacent regions of the first image to generate downsampled pixel values;
    in a storage device, storing the downsampled pixel values; and
    at the processor, generating a downsampled image using the downsampled pixel values as a region of the downsampled image;
wherein combining pixel values from pixels within a plurality of adjacent regions of the first image comprises:
    at the processor, identifying a pixel within each of the adjacent regions, each identified pixel having a common relative location with respect to its region; and
    at the processor, aggregating the identified pixels to generate a pixel value for the downsampled image.

2. The method of claim 1, wherein generating a downsampled image comprises generating a downsampled image using a downsampling ratio of n, and wherein combining pixel values of pixels within a plurality of adjacent regions comprises combining pixel values of pixels within a square having n regions by n regions.

3. The method of claim 1, further comprising repeating the step of combining pixel values of pixels within a plurality of adjacent regions of the first image to generate a plurality of regions of the downsampled image.

4. The method of claim 1, wherein the identified pixels being aggregated are not adjacent to one another.

5. The method of claim 1, wherein aggregating the identified pixels comprises generating an average pixel value based on pixel values of the identified pixels.

6. The method of claim 1, wherein the generated pixel value is associated with a location within the region of the downsampled image corresponding to the common relative location of the identified pixels with respect to their respective regions in the first image.

7. The method of claim 1, wherein the region of the downsampled image has a pixel dimension equal to the pixel dimensions of the regions of the first image.

8. The method of claim 1, wherein the first image and the downsampled image each comprise a light field image.

9. The method of claim 8, wherein:
    the first image and the downsampled image have equal angular resolution; and
    the downsampled image has lower spatial resolution than does the first image.

10. The method of claim 1, wherein the regions of the first image are of uniform size, and wherein the downsampled image comprises at least one region of size equal to the sizes of the regions of the first image.

11. The method of claim 10, wherein the downsampled image comprises fewer regions than does the first image.

12. The method of claim 1, wherein the regions of the first image comprise disks.

13. The method of claim 1, wherein the regions of the first image comprise at least one selected from the group consisting of:
    groups of pixels in a Cartesian arrangement;
    groups of pixels in a hexagonal arrangement; and
    triangular groups of pixels.

14. The method of claim 1, wherein at least two of the regions of the first image overlap one another.

15. The method of claim 1, wherein the regions of the first image have integral pixel dimensions.

16. A method of generating a downsampled image from a first image, comprising:
    at a processor, receiving a first image, the first image comprising a plurality of regions, each region comprising a plurality of pixels, the regions having non-integral pixel dimensions;
    at the processor, determining integral pixel dimensions by rounding off the non-integral pixel dimensions for a region;
    at the processor, defining a plurality of pixel groups of the first image, each pixel group having dimensions corresponding to the determined integral pixel dimensions;
    at the processor, combining pixel values of pixels within a plurality of adjacent ones of the defined pixel groups to generate downsampled pixel values;
    in a storage device, storing the downsampled pixel values; and
    at the processor, generating a downsampled image using the downsampled pixel values as a region of the downsampled image;
wherein combining pixel values from pixels within a plurality of adjacent ones of the defined pixel groups comprises:
    at the processor, identifying a pixel within each of the adjacent pixel groups, each identified pixel having a common relative location with respect to its pixel group; and
    at the processor, aggregating the identified pixels to generate a pixel value for the downsampled image.

17. A method of generating a downsampled image from a first image, comprising:
    at a processor, receiving a first image, the first image comprising a plurality of regions, each region comprising a plurality of pixels, the regions having non-integral pixel dimensions;
    at the processor, determining integral pixel dimensions by rounding off the non-integral pixel dimensions for a region;
    at the processor, resampling pixel values within each region to obtain a group of sample points for each region;
    at the processor, combining pixel values of pixels within a plurality of adjacent ones of the defined groups of sample points to generate downsampled pixel values;
    in a storage device, storing the downsampled pixel values; and
    at the processor, generating a downsampled image using the downsampled pixel values as a region of the downsampled image;
wherein combining pixel values from pixels within a plurality of adjacent ones of the defined groups of sample points comprises:
    at the processor, identifying a pixel within each of the adjacent groups of sample points, each identified sample point having a common relative location with respect to its group; and
    at the processor, aggregating the identified sample points to generate a pixel value for the downsampled image.

18. The method of claim 17, wherein the integral pixel dimensions are n×n, and wherein each group of sample points comprises a square of n sample points by n sample points.

19. A computer program product of generating a downsampled image from a first image, comprising:

a non-transitory computer-readable storage medium; and
computer program code, encoded on the medium, configured to cause at least one processor to perform the steps of:
  receiving a first image, the first image comprising a plurality of regions, each region comprising a plurality of pixels;
  combining pixel values of pixels within a plurality of adjacent regions of the first image to generate downsampled pixel values;
  causing a storage device to store the downsampled pixel values; and
  generating a downsampled image using the downsampled pixel values as a region of the downsampled image;
wherein the computer program code configured to cause at least one processor to combine pixel values from pixels within a plurality of adjacent regions of the first image comprises computer program code configured to cause at least one processor to perform the steps of:
  identifying a pixel within each of the adjacent regions, each identified pixel having a common relative location with respect to its region; and
  aggregating the identified pixels to generate a pixel value for the downsampled image.

20. The computer program product of claim 19, wherein the identified pixels being aggregated are not adjacent to one another.

21. The computer program product of claim 19, wherein the generated pixel value is associated with a location within the region of the downsampled image corresponding to the common relative location of the identified pixels with respect to their respective regions in the first image.

22. The computer program product of claim 19, wherein the first image and the downsampled image each comprise a light field image.

23. The computer program product of claim 22, wherein:
  the first image and the downsampled image have equal angular resolution; and
  the downsampled image has lower spatial resolution than does the first image.

24. A system of generating a downsampled image from a first image, comprising:
  a processor, configured to perform the steps of:
    receiving a first image, the first image comprising a plurality of regions, each region comprising a plurality of pixels; and
    combining pixel values of pixels within a plurality of adjacent regions of the first image to generate downsampled pixel values; and
  a storage device, communicatively coupled to the processor, configured to store the downsampled pixel values;
wherein the processor is configured to combine pixel values from pixels within a plurality of adjacent regions of the first image by:
  identifying a pixel within each of the adjacent regions, each identified pixel having a common relative location with respect to its region; and
  aggregating the identified pixels to generate a pixel value for the downsampled image;
and wherein the processor is further configured to generate a downsampled image using the downsampled pixel values as a region of the downsampled image.

25. The system of claim 24, wherein the identified pixels being aggregated are not adjacent to one another.

26. The system of claim 24, wherein the generated pixel value is associated with a location within the region of the downsampled image corresponding to the common relative location of the identified pixels with respect to their respective regions in the first image.

27. The system of claim 24, wherein the first image and the downsampled image each comprise a light field image.

28. The system of claim 27, wherein:
  the first image and the downsampled image have equal angular resolution; and
  the downsampled image has lower spatial resolution than does the first image.

\* \* \* \* \*